US006243382B1

United States Patent
O'Neill et al.

(10) Patent No.: US 6,243,382 B1
(45) Date of Patent: Jun. 5, 2001

(54) INTERFACING TO SAR DEVICES IN ATM SWITCHING APPARATUS

(75) Inventors: Dominic Christopher O'Neill, Denton; Stephen Martin Elvy, Prestwich; Graeme Roy Smith, Unsworth, all of (GB)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/957,899

(22) Filed: Oct. 27, 1997

(30) Foreign Application Priority Data

Apr. 23, 1997 (GB) .................................................. 9708186

(51) Int. Cl.[7] ..................................................... H04L 12/54
(52) U.S. Cl. ........................................... 370/395; 370/474
(58) Field of Search .............................. 370/474, 395–399

(56) References Cited

U.S. PATENT DOCUMENTS

| 5,570,362 | | 10/1996 | Nishimura ............................ 370/60.1 |
| 5,666,487 | * | 9/1997 | Goodman et al. .................... 709/246 |
| 5,699,369 | * | 12/1997 | Guha .................................... 714/774 |
| 5,764,645 | * | 6/1998 | Bernet et al. ......................... 370/466 |
| 5,898,688 | * | 4/1999 | Norton et al. ........................ 370/362 |
| 5,941,952 | * | 8/1999 | Thomas et al. ....................... 709/234 |
| 5,949,785 | * | 9/1999 | Beasley ................................ 370/398 |

FOREIGN PATENT DOCUMENTS

| 0 531 599 | 3/1993 | (EP) . |
| 0 703 718 | 8/1994 | (EP) . |

OTHER PUBLICATIONS

Acampora, A.F., "Broadband ISDN and ATM," *An Introduction to Broadband Networks*, Plenum Press, New York, 1994, pp. 201, 204, 206 & 218.

Miller, D., "Layer 3 Switching: Near Term Relief for Traffic–Bound Networks?, " *DataQuest: Networking North America*, NETW–NA–DP–9601, Jul. 1, 1996, pp. 1–14.

"A Bridge Too Far," *Personal Computer Magazine*, Apr. 1993, pp. 269–270, 273–274 & 277.

Garg, G., "Utopia Level 2 Specification, Version 0.8," *ATM Forum: PHY Subworking Group*, ATM Forum/95–0114R1, Apr. 1995, pp. 1–65.

"Section 4: Interim local Management Interface Specification," *ATM User–Network Interface Specification (v3.1)*, Sep. 1994, pp. 106–111.

"Combinations of pre–assigned VPI, VCI, PTI and CLP values at UNI," *ITU–T Recommendation I.361, Protocol Layer Requirements, Table 2*, Nov. 1995, 2 pages.

* cited by examiner

*Primary Examiner*—Melvin Marcelo
*Assistant Examiner*—Jasper Kwoh

(57) ABSTRACT

A switching apparatus, for use in an ATM network, includes a switch fabric for switching ATM cells, a segmentation-and-reassembly device for reassembling packets from ATM cells, and a plurality of traffic management devices. Each traffic management device receives ATM cells delivered to associated ports of the apparatus and is connected by a first data delivery path to the switch fabric and by a second data delivery path directly to the segmentation-and-reassembly device. The traffic management device identifies those received ATM cells that belong to one or more predetermined types of packets, requiring reassembly by the segmentation-and-reassembly device, as respective reassembly cells. The traffic management device then delivers received cells other than such identified reassembly cells to the switch fabric via its first data delivery path for switching by the switch fabric, and then delivers the reassembly cells to the SAR device via the second data delivery path for reassembly into packets. The reassembly cells do not pass through the switching fabric in the course of transfer from the traffic management device to the segmentation-and-reassembly device. Optionally, the segmentation-and-reassembly device is part of, or is replaced by, an internet-protocol switch controller used to detect IP flows through the switching apparatus.

28 Claims, 11 Drawing Sheets

INTERFACING TO SAR DEVICES IN ATM SWITCHING APPARATUS

BACKGROUND OF THE INVENTION

1. Field of the Invention

The present invention relates to interfacing to segmentation-and-reassembly (SAR) devices in asynchronous transfer mode (ATM) switching apparatus.

2. Description of the Prior Art

FIG. 1 of the accompanying drawings shows parts of conventional switching apparatus for use in an ATM communications network. The FIG. 1 apparatus comprises a plurality N-1 of physical-layer devices $2_1, 2_2, \ldots 2_{N-1}$ and a corresponding plurality N-1 of traffic management devices $4_1, 4_2, \ldots 4_{N-1}$. Each traffic management device $4_i$ is connected to its corresponding physical-layer device $2_i$ by a bi-directional data delivery path $6_i$.

The FIG. 1 apparatus also includes a switch fabric 8 which is, for example, a N×N cross-connect switching unit. The switch fabric 8 in fact has N input ports and N output ports. Each traffic management device $4_i$ is connected by a bi-directional data delivery path $10_i$ to a port-pair, made up of one input port and one output port. Accordingly, for the sake of simplicity, only the port-pairs are shown in FIG. 1.

The FIG. 1 apparatus also includes a segmentation-and-reassembly (SAR) device 12 which is connected to the port-pair N of the switch fabric 8 by a bi-directional data delivery path $10_N$. This SAR device 12 is in turn connected to an associated memory 14. Finally, the apparatus 1 includes a host processor (or switch controller) 16 which is connected to each of the traffic management devices $4_1$ to $4_{N-1}$ and to the memory 12.

In use of the FIG. 1 apparatus, the physical-layer devices $2_1$ to $2_{N-1}$ provide the apparatus 1 with a plurality of bi-directional ports (user-network interface or UNI ports) which are connected to physical-layer transmission lines. These physical-layer transmission lines may be, for example synchronous digital hierarchy (SDH) or synchronous optical network (SONET) transmission lines (ITU-T standard G.709), plesiochronous digital hierarchy (PDH) transmission lines (ITU-T G.703 standard), or fibre-distributed data interface (FDDI) transmission lines (4b/5b standard specified by the ATM Forum). In an ATM network, these transmission lines carry ATM cells in the form of a bit stream the format of which is dependent upon the particular physical medium used to provide the transmission line concerned. In the data-receiving direction (the direction in which cells are admitted into the switching apparatus) the physical-layer devices $2_1$ to $2_{N-1}$ convert the bit streams received at the UNI ports of the apparatus into streams of ATM cells which are delivered to the traffic management devices $4_1$ to $4_{N-1}$ via the respective data-delivery paths $6_1$ to $6_{N-1}$.

The traffic management devices $4_1$ to $4_{N-1}$ control the delivery of ATM cells to the switch fabric 8. The switch fabric 8 can provide up to N simultaneous data transfer paths, each path serving to permit transfer of data from a selected one of its input ports to a selected one of its output ports. The traffic management devices use these data transfer paths to exchange (switch) ATM cells synchronously. Overall control of the exchange process is normally performed by the host processor 16 which monitors the traffic flow conditions and selects the data transfer paths in successive time slots in order to provide a fair allocation of switch resources amongst the different cell flows passing through the apparatus.

After a traffic management device 4 receives an ATM cell through one of the data transfer paths provided by the switch fabric, it transfers that cell to its corresponding physical-layer device via the data delivery path 6. Each physical-layer device 2 converts the stream of ATM cells received thereby into bit streams suitable for transmission over the ATM transmission lines connected to the UNI ports of the physical-layer device concerned.

In an ATM network in which the FIG. 1 apparatus is used, most, but not all, of the ATM cell traffic carried is user data, whether that data represents voice signals, video signals, files, etc. However, some of the traffic carried by the network inevitably comprises control information such as signalling messages. Such signalling messages are required, for example, to establish a call. In addition, there may be a requirement for the host processors at different nodes of the ATM network (including the host processor 16 shown in FIG. 1) to communicate with one another using so-called "inter-host communication messages".

The signalling messages and inter-host communication messages are transferred across the ATM network in the form of ATM cells just like ordinary data traffic. However, the cells making up such messages are distinguished in some way from cells representing data, normally by the virtual path identifier (VPI) and virtual channel identifier (VCI) information contained in the header of each cell. The signalling messages and inter-host communication messages are generally too long to fit in the payload of a single ATM cell. Accordingly, at the source of each such message, the message is converted into a plurality of ATM cells which are then introduced successively into the network. This process is referred to as segmentation. At the destination of the message, and possibly also at any intermediate node of the ATM network at which it is desired to have access to the message concerned, the ATM cells making up the message are combined, in a process referred to as reassembly, to reproduce the original message. In the switching apparatus shown in FIG. 1, these segmentation and reassembly processes are carried out by the segmentation-and-reassembly (SAR) device 12 which is conventionally provided with its own dedicated port-pair (port N in FIG. 1) of the switch fabric 8. Thus, when the host processor 16 is informed that an ATM cell, whose VPI/VCI fields indicate that it belongs to a signalling message or an inter-host communications message, has been received by one of the traffic management devices 4 (the "source" traffic management device), the host processor 16 causes a data transfer path to be established from the input port of the switch fabric 8 to which the source traffic management device is connected (for example, input port 1 in the case of the traffic management device $4_1$) to the output port N of the switch fabric 8 so that the cell concerned can be delivered from the source traffic management device to the SAR device 12. The SAR device 12 then combines that cell with other cells belonging to the same message, using the memory 14, and, once the reassembly process for that message is complete, the message can be read by the host processor 16.

If the host processor 16 is the source of a signalling message or inter-host communication message it delivers that message to the memory 14 and the SAR device 12 then segments the message to produce a plurality of ATM cells. These cells are then transferred successively to one of the traffic management devices (the "destination" traffic management device), which is the traffic management device whose corresponding physical-layer device is connected to the transmission line through which the cells must be routed to reach the destination of the message. Under the control of the host processor 16, a data transfer path is provided for each successive cell of the message from the input port N of the switch fabric 8 to the output port of the switch fabric to which the destination traffic management device is connected. After reaching that destination traffic management device 4 the cells are then passed via the data delivery path 6 to the corresponding physical-layer device 2 and are output to the required transmission line through one of the UNI ports for onward transmission to the destination of the message.

In the FIG. 1 apparatus, the SAR device 12 is provided with its own dedicated port-pair (port N) on the switch fabric and the signalling messages and inter-host communication messages accordingly all pass through the switch fabric 8. Although the number of ATM cells involved in such messages is relatively small, as compared to the total number of ATM cells passing through the switch fabric, the need to pass the ATM cells making up the signalling and inter-host communication messages through the switch fabric inevitably leads to congestion in the switch fabric and reduces the number of opportunities to switch ATM cells representing user data. Furthermore, because one of the port-pairs of the switch fabric must be dedicated to the SAR device 12, the number of port-pairs available for connection to the traffic management devices is reduced by one. This ultimately limits the number of UNI ports of the switching apparatus as a whole.

BRIEF SUMMARY OF THE INVENTION

According to a first aspect of the present invention there is provided switching apparatus, for use in an ATM network, including: a switch fabric for switching ATM cells; reassembly means for reassembling packets from ATM cells; and traffic management means connected for receiving ATM cells delivered to the apparatus and also connected by first data delivery path means to the said switch fabric and by second data delivery path means, separate from the first data delivery path means, to the said reassembly means, and operable to identify those received ATM cells that belong to one or more predetermined types of packet, requiring reassembly by the reassembly means, as respective reassembly cells, and to deliver received cells other than such identified reassembly cells to the switch fabric via the said first data delivery path means for switching by the said switch fabric and to deliver the said reassembly cells to the said reassembly means via the said second data delivery path means for reassembly into packets by the reassembly means.

According to a second aspect of the present invention there is provided a traffic management device, for use in ATM switching apparatus having a switch fabric for switching ATM cells delivered to the apparatus and also having reassembly means for reassembling packets from ATM cells delivered to the apparatus, which device includes: cell receiving means for receiving ATM cells; cell identification means connected to the said cell receiving means and operable to identify as respective reassembly cells those received cells that belong to one or more predetermined types of packet requiring reassembly by the said reassembly means of the apparatus; and cell output means having first port means adapted for connection, when the device is in use, to the said switch fabric, and also having second port means, separate from the said first port means, adapted for connection when the device is in use to the said reassembly means, and operable to deliver received cells other than the identified reassembly cells to the said first port means and to deliver the said reassembly cells to the said second port means.

According to a third aspect of the present invention there is provided a switching method, for use in ATM-network switching apparatus that includes a switch fabric for switching ATM cells, reassembly means for reassembling packets from ATM cells, and traffic management means for receiving ATM cells delivered to the apparatus, in which method: those received ATM cells that belong to one or more predetermined types of packet, requiring reassembly by the reassembly means, are identified by the traffic management means as respective reassembly cells; received cells other than such identified reassembly cells are delivered by the traffic management means to the switch fabric via first data delivery path means and are switched by the switch fabric; and the identified reassembly cells are delivered from the traffic management means to the reassembly means via second data delivery path means separate from the first data delivery path means, and are reassembled into packets by the reassembly means.

In the first to third aspects of the present invention the cells requiring reassembly can be sent directly to the reassembly means without passing through the switch fabric. Accordingly, all of the switch ports of the switch fabric are available for use by the traffic management means to switch the non-reassembly cells. Switch throughput is therefore increased and contention problems in the switching apparatus are alleviated.

Packets requiring reassembly may be, for example, signalling messages (in particular AAL5 messages) or inter-host communication messages (in particular Interim Local Management Interface (ILMI) communications between ATM user-network interface (UNI) management entities).

Packets requiring reassembly may also include internet-protocol packets. In this case, the apparatus preferably further includes internet-protocol switch controller means connected with the said reassembly means for examining such reassembled internet-protocol packets to detect packet flows through the switching apparatus. The traffic management means can then send cells needed by the internet-protocol switch controller means directly thereto without those cells passing through the switch fabric.

Preferably, the traffic management means are operable, in a default routing mode thereof, to receive such internet-protocol packets from an upstream node of the ATM network via a predetermined default input virtual channel and to identify, as such reassembly cells, received ATM cells belonging to the said predetermined default input virtual channel and to deliver those cells via the said second data delivery path means to the said reassembly means so as to permit the said internet-protocol switch controller means to detect packet flows from examination of the reassembled packets. The traffic management means are also switchable, upon detection by the said internet-protocol switch controller means of such a packet flow, to operate in an cut-through switching mode in which the cells of subsequent packets making up the detected packet flow are received by the traffic management means via a new input virtual channel, different from the said predetermined default input virtual channel, and are not identified as such reassembly cells and are delivered directly to the switch fabric via the said first data delivery path means.

In this way, cells belonging to detected flows can be routed through the switching apparatus without being reassembled in the switching apparatus by the internet-protocol switch controller means, so as to implement so-called cut-through switching in which the cells of flows are routed directly in hardware. For example, upon detection by the said internet-protocol switch controller means of such a packet flow, the traffic management means may be caused to reserve bandwidth for switching the cells of the detected packet flow via the said switch fabric.

Preferably, reassembled packets not detected by the said internet-protocol switch controller means as belonging to a packet flow are segmented into a plurality of cells which are transferred back to the traffic management means for delivery to the said switch fabric, so as to implement store-and-forward routing of the IP packets that do not belong to flows. After passage through the said switch fabric, the cells of the said plurality may then be output to a downstream node of the ATM network via a predetermined default output virtual channel. On the other hand, during operation of the traffic management means in the said cut-through switching mode, the cells of the said subsequent packets making up the detected packet flow are preferably output by the traffic management means via a new output virtual channel, different from the said predetermined default output virtual channel.

In one embodiment, the said traffic management means include cell identification means operable to examine the virtual-path-identifier and/or virtual-channel-identifier fields of the header of each received ATM cell and to determine, in dependence upon the results of such examination, whether or not the cell concerned is to be identified as such a reassembly cell. This makes it possible to identify the reassembly cells quickly and easily.

Preferably, the apparatus further includes segmentation means (the segmentation means and the reassembly means may form part of the same segmentation-and-reassembly device), which segmentation means are also connected to the said traffic management means by the said second data delivery path means, and are operable to segment a packet generated locally in the apparatus into a plurality of ATM cells and to deliver the cells of the said plurality to the traffic management means via the said second data delivery path means. In this arrangement the cells resulting from segmentation can also be delivered to the traffic management means without passing through the switch fabric.

In this case, the second data delivery path means may include respective unidirectional transmit and receive path means, the receive path means serving to deliver the identified reassembly cells from the traffic management means to the reassembly means, and the transmit path means serving to deliver the cells of the said plurality from the said segmentation means to the traffic management means.

In a preferred embodiment, the said traffic management means include a plurality of individual traffic management devices connected respectively to the said switch fabric by the said first data delivery path means for exchanging ATM cells via data transfer paths provided by the switch fabric, and the said second data delivery path means comprise bus means (for example Universal-Test-and-Operations- PHY-Interface-for-ATM (UTOPIA) level 2 "lookalike" bus means) connecting the individual traffic management devices in common to the reassembly means and, if provided, to the said segmentation means. In this arrangement, each traffic management device controls the delivery of cells to one or more associated input ports of the switch fabric, and each traffic management device can send any reassembly cells directly to the reassembly means using the bus means.

To enable the different traffic management devices to share the bus means, it is preferable that the said reassembly means are operable as a master device of the said bus means and each traffic management device is operable as a slave device of the said bus means. In this case, for example, the said reassembly means include: polling means for polling the traffic management devices to determine if any of them has identified a received ATM cell as being such a reassembly cell; and data reading means operable, if it is determined by the said polling means that one of the said traffic management devices has identified such a reassembly cell, to cause the traffic management device having that cell to deliver it to the reassembly means via the said bus means.

According to a fourth aspect of the present invention there is provided switching apparatus, for use in an ATM network, including: a switch fabric for switching ATM cells; segmentation means for segmenting a packet generated locally in the apparatus into a plurality of ATM cells; and traffic management means connected by first data delivery path means to the said switch fabric and by second data delivery path means, separate from the said first data delivery path means, to the said segmentation means, and operable to receive from the switch fabric via the said first data delivery path means cells that have been switched by the switch fabric and to receive from the segmentation means via the said second data delivery path means the cells of the said plurality, and to output an ATM cell stream including the switched cells received from the switch fabric and the cells of the said plurality received from the segmentation means.

According to a fifth aspect of the present invention there is provided a traffic management device, for use in ATM switching apparatus having a switch fabric for switching ATM cells delivered to the apparatus and also having segmentation means for segmenting packets generated locally by the apparatus into a plurality of ATM cells to be output from the apparatus, which device includes: cell input means having first port means adapted for connection, when the device is in use, to the said switch fabric, and also having second port means, separate from the said first port means, adapted for connection when the device is in use to the said segmentation means, and operable to receive at the said first port means cells that have been switched by the switch fabric and to receive at the said second port means the cells of the said plurality; and cell output means for outputting an ATM cell stream including the switched cells received from the switch fabric and also including the cells of the said plurality.

According to a sixth aspect of the present invention there is provided a switching method, for use in ATM-network switching apparatus that includes a switch fabric for switching ATM cells, segmentation means for segmenting a packet generated locally in the apparatus into a plurality of ATM cells, and traffic management means for outputting switched cells, in which method: cells that have been switched by the switch fabric are received by the traffic management means from the switch fabric via first data delivery path means; the plurality of cells produced by the segmentation means are received by the traffic management means via second data delivery path means separate from the said first data delivery path means; and an ATM cell stream, including the switched cells received from the switch fabric and the cells of the said plurality received from the segmentation means, is output by the traffic management means.

In the fourth to sixth aspects of the invention, advantages corresponding to the advantages achieved by the first to third aspects of the invention can be obtained even when the switching apparatus has no reassembly means. The cells resulting from segmentation can be transferred directly to the traffic management means without passing through the switch fabric, freeing up the switch ports of the switch fabric for non-segmentation cells and alleviating congestion.

According to a seventh aspect of the present invention there is provided switching apparatus, for use in an ATM network, including: a switch fabric for switching ATM cells; internet-protocol switch controller means for detecting internet-protocol flows through the switching apparatus; and traffic management means connected for receiving ATM cells delivered to the apparatus and also connected by first data delivery path means to the said switch fabric and by second data delivery path means, separate from the first data delivery path means, to the said internet-protocol switch controller means, and operable, in a default routing mode thereof, to identify, as default-routing cells, those received ATM cells belonging to a predetermined default input virtual channel and to deliver those cells via the said second data delivery path means to the said internet-protocol switch controller means so as to permit the said internet-protocol switch controller means to detect such flows from examination of the delivered cells, and being switchable, upon detection by the said internet-protocol switch controller means of such a flow, to operate in a cut-through switching mode in which the subsequently-received cells making up the detected flow are received by the traffic management means via a new input virtual channel, different from the said predetermined default input virtual channel, and are not identified as such default-routing cells and are delivered directly to the switch fabric via the said first data delivery path means.

According to an eighth aspect of the present invention there is provided a traffic management device, for use in ATM switching apparatus having a switch fabric for switching ATM cells delivered to the apparatus and also having internet-protocol switch controller means for detecting internet-protocol flows through the switching apparatus, which device includes: cell receiving means for receiving ATM cells; cell output means having first port means adapted for connection, when the device is in use, to the said switch fabric, and also having second port means, separate from the said first port means, adapted for connection when the device is in use to the said internet-protocol switch controller means; and cell identification means connected to the said cell receiving means and operable, in a default routing mode thereof, to identify, as default-routing cells, those received ATM cells belonging to a predetermined default input virtual channel and to deliver those cells to the said second port means for transfer to the said internet-protocol switch controller means so as to permit the said internet-protocol switch controller means to detect such flows from examination of the delivered cells, and being switchable, upon detection by the said internet-protocol switch controller means of such a flow, to operate in a cut-through switching mode in which the subsequently-received cells making up the detected flow are received by the traffic management device via a new input virtual channel, different from the said predetermined default input virtual channel, and are not identified as such default-routing cells and are delivered to the first port means for transfer directly to the switch fabric.

In the seventh and eighth aspects of the invention it is not necessary that the internet-protocol switch controller means have reassembly means for reassembling the identified default-routing cells received from the traffic management means.

DETAILED DESCRIPTION OF THE PREFERRED EMBODIMENTS

Figure 1:
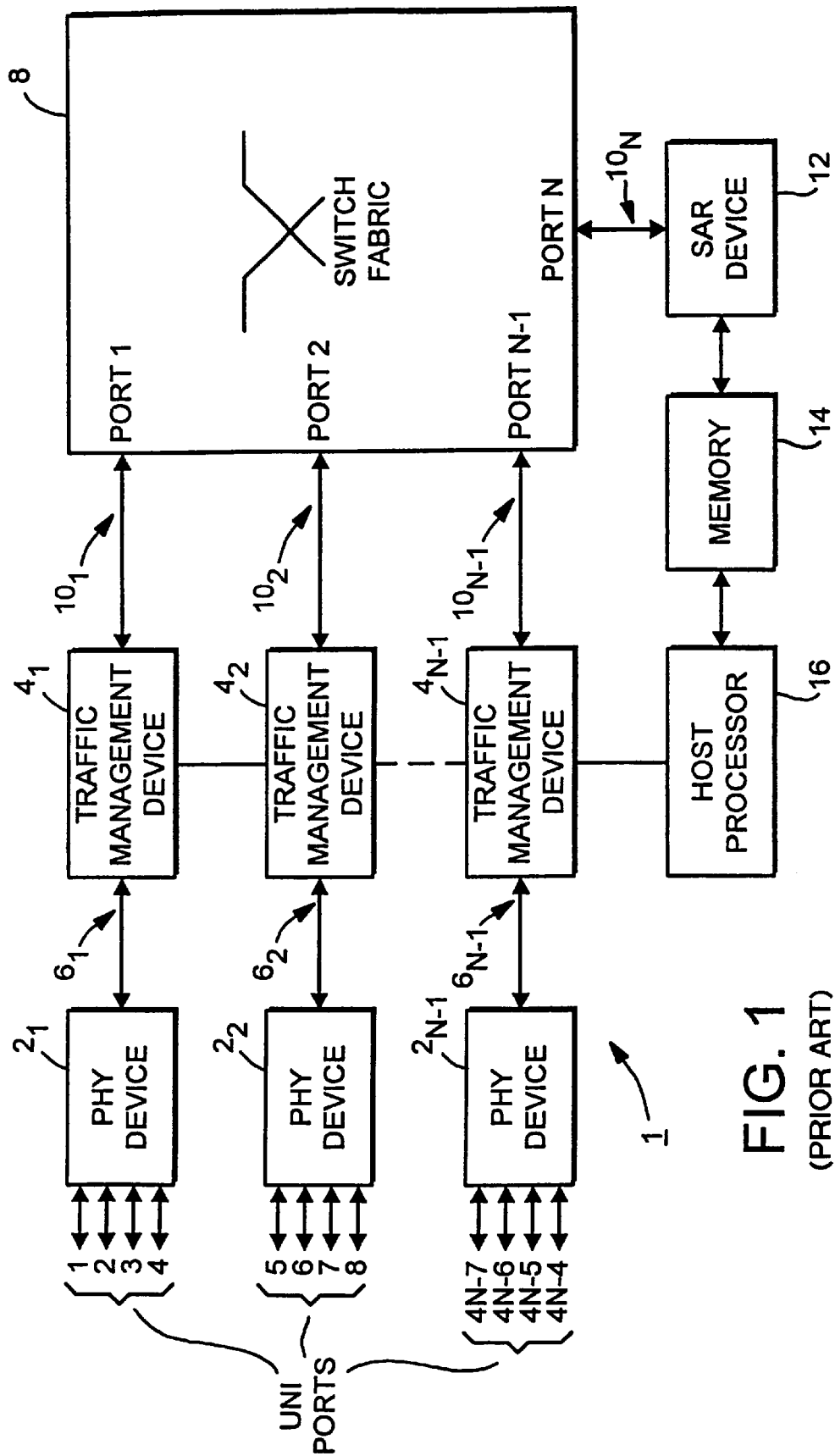
FIG. 1, discussed hereinbefore, shows parts of switching apparatus previously considered for use in an ATM network.
Figure 2:
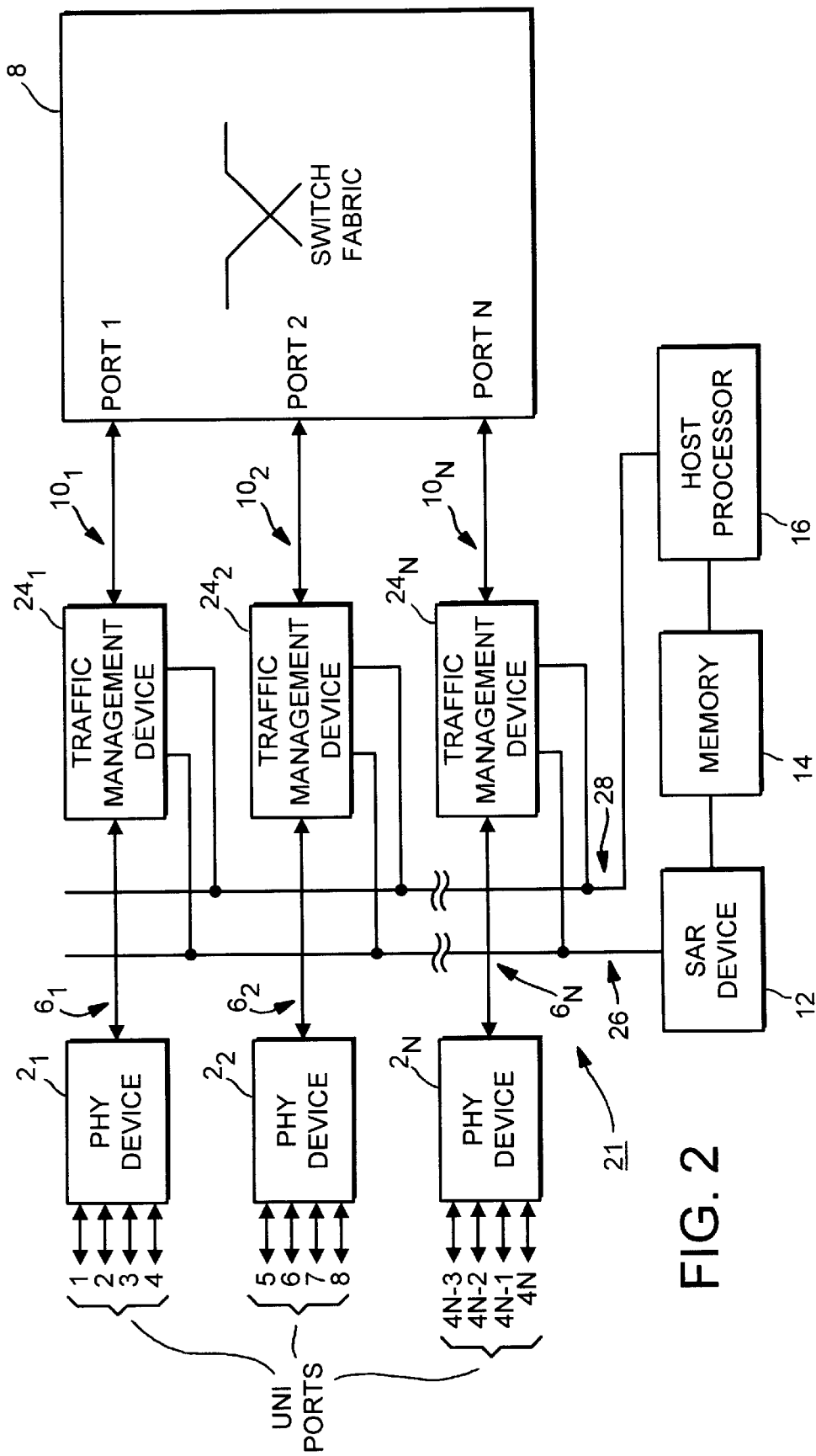
FIG. 2 shows parts of ATM switching apparatus according to a first embodiment of the present invention.

FIG. 2 shows parts of ATM switching apparatus embodying the present invention. In FIG. 2, parts which correspond to parts already described before with reference to FIG. 1 will be denoted by the same reference numerals.

In the FIG. 2 switching apparatus 21, each traffic management device $24_1$ to $24_N$ is modified as compared to the traffic management devices $4_1$ to $4_{N-1}$ described hereinbefore with reference to FIG. 1. As in the FIG. 1 apparatus, each traffic management device $24_i$ is connected to its corresponding physical-layer device $2_i$ by way of a data delivery path $6_i$ (i=1 to N). Each data delivery path $6_i$ is a Universal Test and Operations PHY interface (UTOPIA) level 2 path providing in each direction a 16 bit data path for data transfer at up to 622 Mbps (clock frequency $\leq 50$ MHz). Each physical-layer device 2 and each traffic management device 4 therefore has two ports (one for transmitting and the other for receiving), and both ports use the same protocol and interface definition.

Although for simplicity only one physical-layer device $2_i$ is shown connected to each traffic management device $24_i$ in FIG. 2, the UTOPIA level 2 path $6_i$ can in fact permit connection of up to n physical-layer devices to each traffic management device, where $n \leq 8$ in the case in which the ATM layer operates at 155 Mbps and $n \leq 4$ in the case in which the ATM layer operates at 622 Mbps. The UTOPIA level 2 interface includes five addressing lines, thereby providing a virtual space for up to 31 ports on up to 8 physical-layer devices.

A more complete description of the UTOPIA Level 2 interface can be found in "UTOPIA", An ATM-PHY Interface Specification, Level 2, Version 1.0", June 1995, published by the ATM Forum.

Each traffic management device $24_i$ is also connected by a data delivery path $10_i$ to a port-pair of the switch fabric 8, which port-pair is made up of an input port and an output port. The data delivery path $10_i$ can be of any suitable type, parallel or serial, but in the present embodiment the interface for the data delivery path $10_i$ provided at the traffic management device $24_i$ is a UTOPIA level 2 "lookalike" (UL2LAL) interface. This has basically the same characteristics as the above-mentioned UTOPIA level 2 standard interface promulgated by the ATM Forum but is described as being a "lookalike" interface to that standard interface because the UTOPIA standard interface is intended to connect ATM-layer devices (such as the traffic management devices) to physical-layer devices, and not to provide connections between two ATM-layer devices such as the traffic management device and the switch fabric.

It is also possible for the data delivery path $10_i$ to contain a parallel/serial converter so that the path is parallel at the end connected to the traffic management device $24_i$ and serial at the end connected to the switch fabric. This can enable the number of connection pins on the switch fabric 8 to be reduced, as described in the present assignee's copending United Kingdom Patent Application No. 9617110.3 and U.S. patent application No. 08/869,762. Alternatively, or in addition, plural traffic management devices may be connected to the same port-pair on a time-division-multiplexing basis, again so as to reduce the number of connection pins required on the switch fabric 8, as also described in the present assignee's copending United Kingdom Patent Application No. 9617110.3 and U.S. patent application No. 08/869,762. The contents of that application, and of the present assignee's further copending United Kingdom Patent Application No. 9617100.4 and U.S. patent application No. 08/866,252, are incorporated herein by reference.

Each traffic management device $24_i$ is also connected to the host processor 16 by way of a host bus 28. The host bus is, for example, a bidirectional 32-bit-wide data path with address lines sufficient in number to address (poll) individually the N different traffic management devices $24_1$ to $24_N$.

The switching apparatus 21 shown in FIG. 2 differs from the switching apparatus 1 shown in FIG. 1 primarily by virtue of the fact that a further bus 26, referred to hereinafter as the SAR bus, is provided to connect each traffic management device $24_1$ to $24_N$ to the segmentation-and-reassembly (SAR) device 12. Accordingly, unlike in the FIG. 1 switching apparatus, the SAR device 12 is not connected to one of the port-pairs of the switch fabric 8. The SAR bus 26 is preferably a half-width (8-bit data in each direction) UL2LAL interface. In this case, the SAR device 12 is the master device, which has control over the SAR bus 26, and each traffic management device $24_1$ to $24_N$ is a slave device. Alternatively, the SAR bus 26 could be a high-speed serial bus so as to reduce the pin count of the traffic management devices 24 and SAR device 12. The second bus may be used to transfer Low Voltage Differential Signals (LVDS).

The SAR device 12 may be, for example, type MB86687A manufactured by the present assignees.

Operation of the FIG. 2 apparatus will now be described. Before describing the detailed operation of the apparatus, however, a brief overview will be given with reference to FIG. 3 of a broadband integrated services digital network (B-ISDN) in which the FIG. 2 switching apparatus may be used. It will be understood that the FIG. 2 switching apparatus is not limited to being used in a B-ISDN, but the B-ISDN serves to provide a useful example for the purposes of explanation since it involves connection-oriented communication protocols that give rise to large numbers of signalling messages (and inter-host communication messages) of the kind which embodiments of the present invention are intended to deal effectively with. However, all communications protocols used in ATM networks, even connectionless protocols, inevitably involve the generation and processing of signalling messages, and embodiments of the present invention are applicable advantageously to all such networks.

Figure 3:
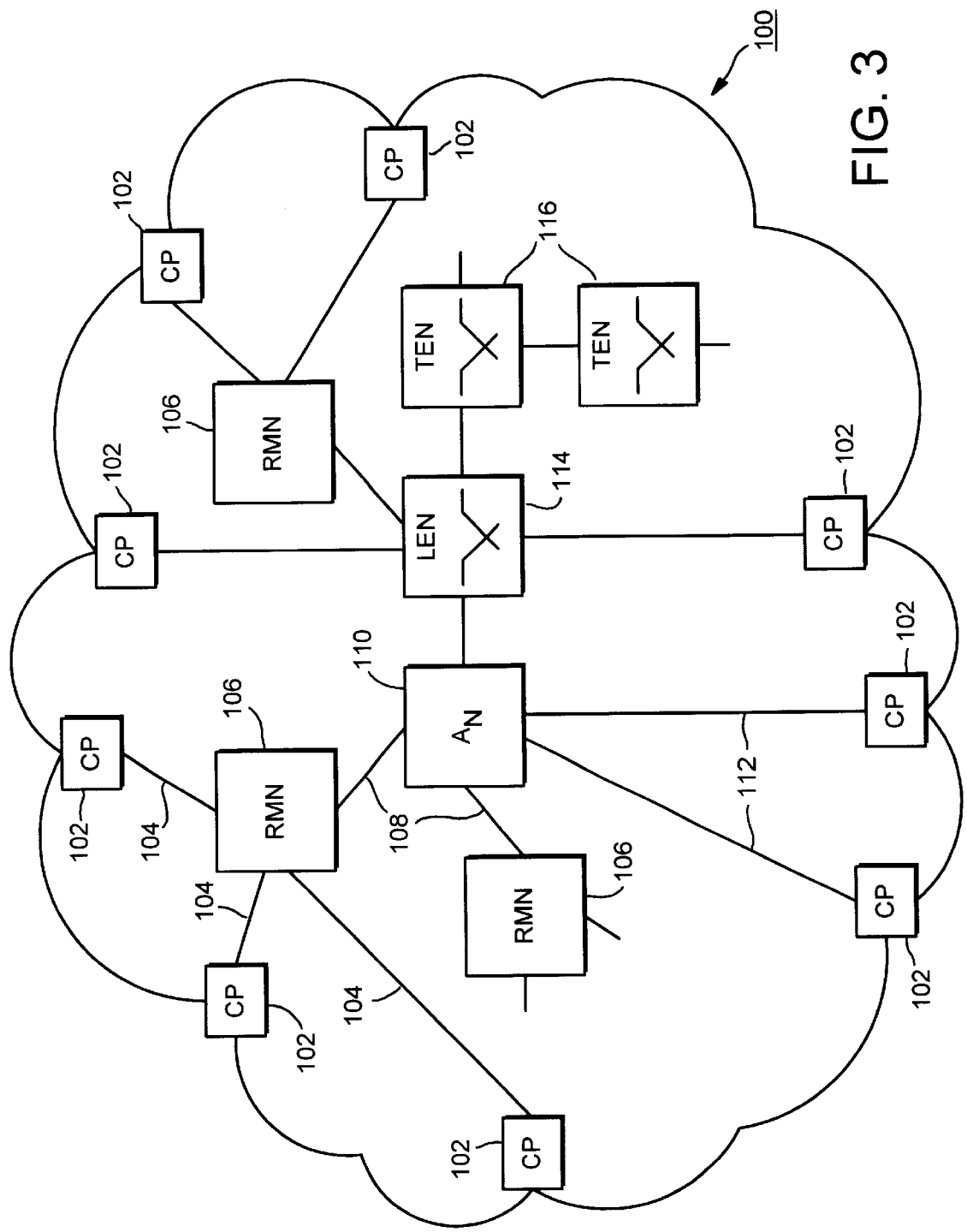
FIG. 3 shows in schematic form a broadband integrated services digital network (B-ISDN) in which the FIG. 2 apparatus may be used.

The B-ISDN network 100 shown in FIG. 3 has a plurality of customer premises (CP) nodes 102 corresponding respectively to different customer premises. At each CP node arbitrarily-formatted information supplied by the user is converted into an ATM cell stream, and, in the reverse direction, an ATM cell stream received from the network is converted into user information in the required format. These conversions are performed by an ATM adaptation layer (AAL) in the CP node which serves the function of a terminal adaptor. CP nodes which only generate and receive low-bandwidth ATM cell streams are normally connected by fixed-point transmission facilities to a remote multiplexer node (RMN) 106 at which the individual low-bandwidth ATM cell streams are statistically multiplexed into/demultiplexed from a concentrated link 108. Several such concentrated links 108 are connected to an access node (AN) 110 to which higher-bandwidth CP nodes 102 may also be connected by links 112. A highly-multiplexed ATM cell stream emerging from the access node 110 is carried to a local exchange node (LEN) 114 to which other RMNs 106 and even very-high-bandwidth CP nodes 102 may also be connected. The FIG. 2 switching apparatus may, for example, be used in the LEN 114. The LEN 114 is connected to a tandem exchange node (TEN) 116 which is a larger ATM switch than the LEN 114. Again, the FIG. 2 switching apparatus may be used in the TEN 116.

The B-ISDN network 100 shown in FIG. 3 is a connection-oriented network which requires connection-oriented communication protocols. Connection-oriented protocols require a call setup procedure, even though the information flows between different CP nodes are in the form of ATM cells with header fields containing the routing information. The call setup procedure selects a path or route to be used by all ATM cells associated with a connection, and the traffic intensity appearing on each physical link of the network, for example the links 108 in FIG. 3, is controlled by limiting the number of connections sharing that link. The paths are selected so as to spread the total applied loads fairly among all of the network links and packet switching nodes (for example the LEN 114 and TEN 116), the intention being to avoid congestion.

If a new connection is admitted, a "virtual connection" number (i.e. particular virtual path identifier (VPI) and virtual channel identifier (VCI) values) is assigned to that connection, and appears in the VPI/VCI fields of all ATM cells belonging to that connection. The virtual connection number implicitly identifies both the source and destination for each packet upon call establishment. Each switch along the selected path is informed, using signalling messages, of the assigned virtual connection number, and is provided with routing instructions to be followed whenever an ATM cell containing that virtual connection number arrives.

The connection-oriented communication protocols are implemented by a call processing function. This function is generally the shared responsibility of processors attached to the geographically-distributed CP nodes but for the purposes of explanation it is possible to regard the call processing function as being implemented as a single centralised processor. Each CP node has a permanent virtual channel number assigned to it for communication with the centralised call processor, and the centralised call processor is connected to the transport network through an ordinary CP node and therefore appears to the transport network like any other user or application. A user at a particular CP node ("source" CP node) may use the permanent virtual connection from that CP node to the call processor to request a connection to another desired CP node ("destination" CP node). The requested connection may be two-way to enable full duplex operation. The call processor uses a permanent virtual connection from itself to the destination CP node to ask the destination CP node if it wishes to accept the requested connection. If so, the call processor attempts to find a path which, when loaded with the requested new virtual connection, will still enable the quality of service currently enjoyed by each other connection already using that path to be maintained at above the guaranteed minimum level.

If the destination CP node refuses to accept the connection, or if a suitable path cannot be found, the connection is blocked and the source CP node is informed of this using a signalling message sent via the permanent virtual connection from the call processor to the source CP node. If, on the other hand, the connection can be established, all switching nodes along the selected path are informed by the processor of the new virtual connection number, and are provided with appropriate routing instructions. For this purpose, signalling messages are sent from the call processor to the affected switching nodes via permanent virtual connections. These signalling messages are required to be delivered to the host processor in the switching node, for example the host processor 16 in the FIG. 2 switching apparatus. The way in which the signalling messages are handled within the FIG. 2 apparatus itself will be considered in more detail later on.

Incidentally, in addition to permanent (pre-configured) virtual connections, switched (dial-up connectivity) virtual connections can also be used to carry signalling messages.

Once the call has been established, the source and destination CP nodes exchange information over the assigned path (or paths, in the case of a duplex connection). Each ATM cell passing along the assigned path(s) contains the assigned virtual connection number in its header, and only the header is processed (in real time, preferably using VLSI circuitry wherever possible) by the switching nodes to make the required routing decision. Accordingly, all cells associated with a given virtual connection follow the same route through the network and are delivered in the same sequence in which they were generated.

When either the source or destination CP node wishes to end the call, a process similar to call establishment is used to effect call release. Again, permanent virtual connections are used to send signalling messages between the source and destination CP nodes and the call processor, and between the call processor and the affected switching nodes.

In the FIG. 3 network, just as user information is transported in the form of ATM cells, the signalling messages between the source and destination CP nodes and between the call processor and the switching nodes are also sent in the form of ATM cells. The conversion of user information and signalling messages into ATM cells is the function of the ATM adaptation layer (AAL).

Figure 4:
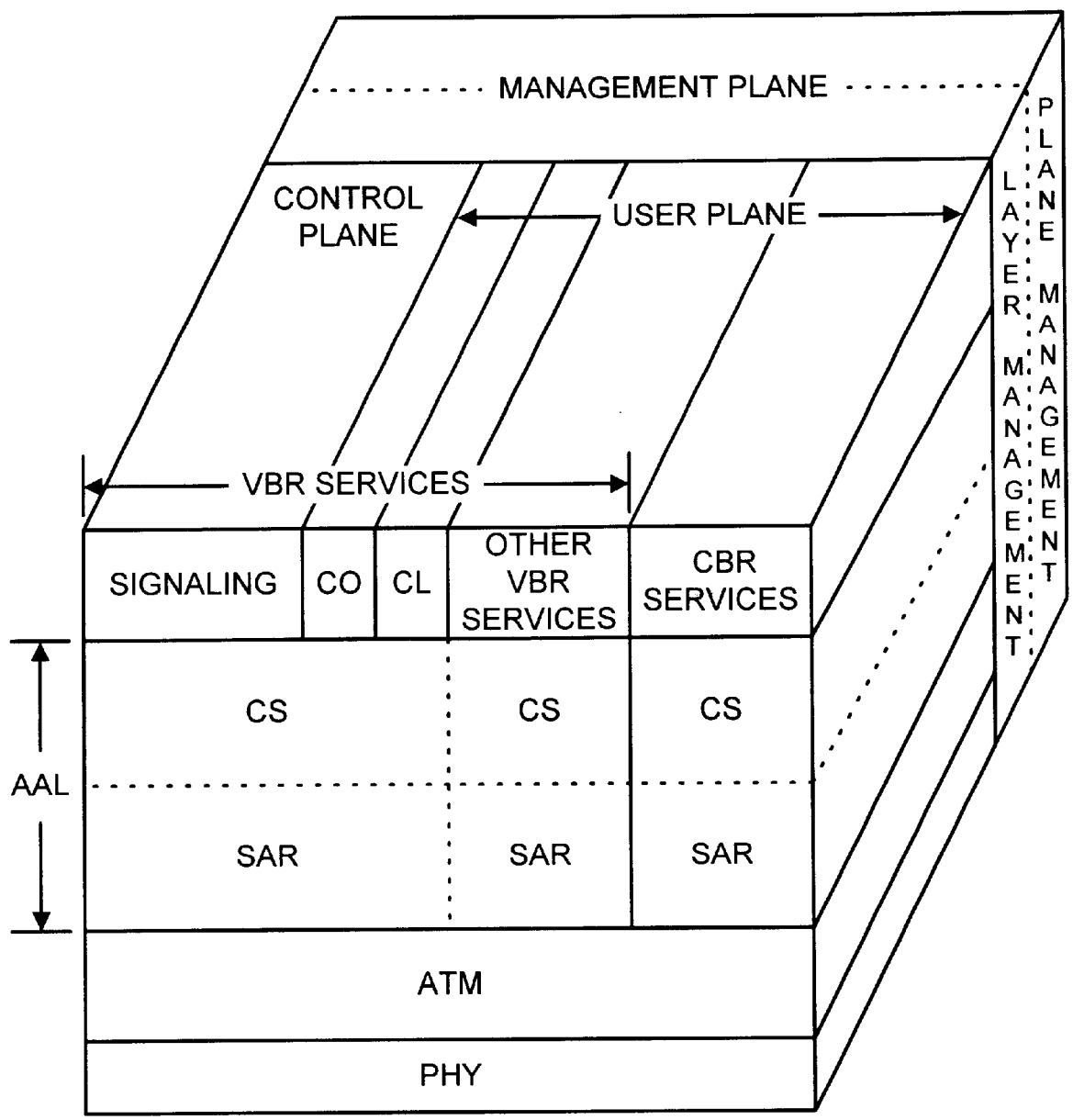
FIG. 4 shows a layer model for use in explaining communications protocols used in the FIG. 3 network.

Referring to FIG. 4, which shows the protocols relevant to the operation of one of the CP nodes shown in FIG. 3, the ATM adaptation layer for the CP node may need to support several types of services. User services include connection-oriented, connectionless and possibly other types of variable bit rate (VBR) services, and constant bit rate (CBR) services. VBR services support non-persistent types of traffic having various different peak data rates, for example bursty data traffic, image files, large database file transfer, packet video and packet voice. CBR services, on the other hand, support persistent types of traffic that have a constant data rate over a prolonged period, for example digital video and 64 k bit/s digital voice. Control signals (signalling messages) are provided as yet another VBR service.

The AAL has a user interface at which it receives user-generated information signals, and a control interface at which it receives control signals. The AAL serves to convert the information and control signals into a standard format suitable for ATM prior to introducing these signals into the ATM network, and to reconstruct the information signals and control signals from ATM cells arriving from the network prior to outputting them to the user and control interfaces.

Figure 5:
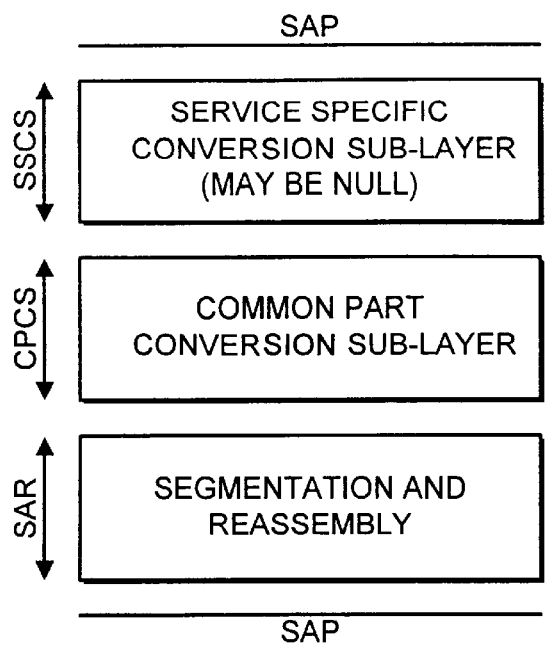
FIG. 5 shows in more detail than in FIG. 4 an ATM adaptation layer (AAL) shown in the FIG. 4 model.

The AAL is in turn divided into two sub-layers as shown in FIG. 4. The conversion sub-layer (CS) performs an encapsulation/de-encapsulation function for the user-generated signals and control signals. In fact, as shown in FIG. 5, in certain types of AAL, for example AAL3/4 and AAL5, the CS sub-layer has been further subdivided into a common part conversion sub-layer (CPCS) and a service specific conversion sub-layer (SSCS). A number of SSCS protocols have been defined, or are currently under development, to support specific AAL user services. AAL5 is generally used for signalling messages.

Figure 6:
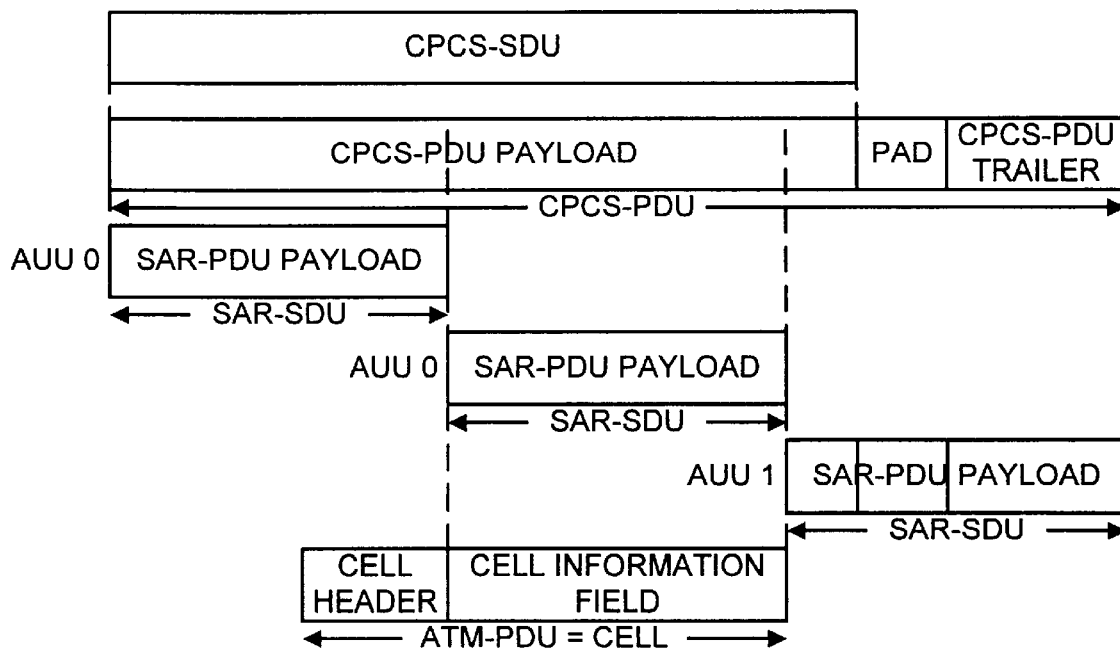
FIG. 6 is a schematic diagram for use in explaining segmentation and reassembly processes in accordance with one type of AAL.
Figure 7:
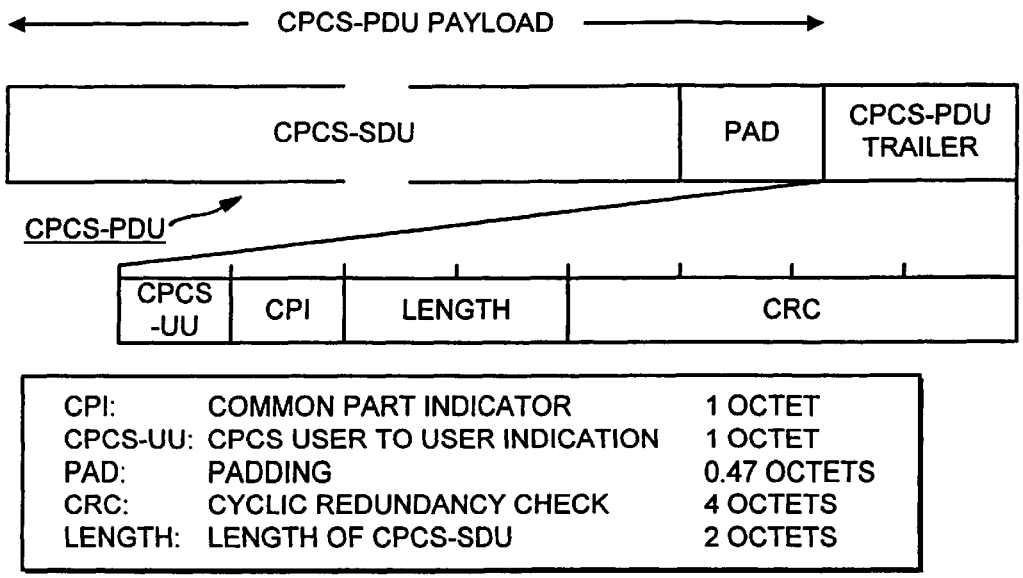
FIG. 7 shows in more detail than in FIG. 6 one of the data entities employed in the segmentation and reassembly processes of FIG. 6.

As shown in FIG. 6, which relates to AAL5, at a source CP node an original user-generated information signal, or a control signal, to be transported through the ATM network and ultimately to be delivered to the destination CP node is delivered (after processing in the SSCS, if provided) to the CPCS in the form of a CPCS service data unit (CPCS-SDU). In the CPCS the signal (CPCS-SDU) is encapsulated in a CPCS protocol data unit (CPCS-PDU) as the payload thereof, as shown in FIG. 7. The CPCS-PDU also has a padding field, which can be up to 47 octets in length, and an 8 octet trailer, the format of which is shown in more detail in FIG. 7. A CPCS-user-to-user (CPS-UU) indication field is used to transparently transfer CPCS user-to-user information. Currently, a common part indicator (CPI) is only used to indicate 64 bit alignment of the trailer and is set to 0, but possible future functions under consideration include the identification of management messages, for fault monitoring purposes etc., and the identification of operation-and-maintenance (OAM) messages. A length field simply indicates the length of the CPCS-PDU payload. The payload length can range from 1 to 65535 octets and must be octet aligned. The length field is used by the receiver to detect the loss or gain of information. The length field is binary encoded with the number of octets. A cyclic redundancy check (CRC) field is used to detect bit errors in the CPCS-PDU. The scope of the CRC covers the whole of the CPCS-PDU including the padding field, the CPCS-UU, the CPI and the length field.

Although as shown in FIG. 6 the CPCS-PDU does not have a header, a header may already have been added by a service specific conversion sub-layer (SSCS) in which case that header will accordingly form a part of the CPCS-SDU.

Figure 8:
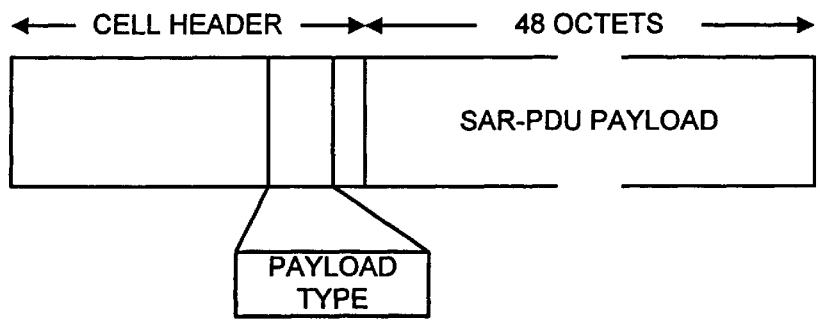
FIG. 8 shows the format of a ATM cell employed in the FIG. 6 segmentation and reassembly processes.

The whole of the CPCS-PDU is then passed to the SAR sub-layer (FIG. 4) which treats the CPCS-PDU as a single field of variable length. As shown in FIG. 6, the SAR function then divides the CPCS-PDU into 48-octet segments, each of which constitutes the payload of one SAR-PDU. The last segment may need padding to form a full 48-octet payload. The SAR-PDU further comprises a 5-byte header, as shown in FIG. 8.

In the AAL5 SAR function, the main focus is efficiency, and accordingly all of the 48 octets available in an ATM cell payload are used to carry the user or control information. Accordingly, none of the octets of the SAR-PDU payload is available to indicate the beginning, continuation or end of the message. Instead, the payload type (PT) field of the ATM cell header is used by the SAR function to detect the beginning, continuation and end of messages. The usual PT information is still carried in the PT field but is encoded with an ATM-layer-user-to-ATM-layer-user (AUU) parameter to produce the payload type codings shown in FIG. 8.

This completes the segmentation process performed by the AAL5 layer. The reassembly process is essentially the reverse of the segmentation process and serves to reconstitute a message (CPCS-SDU or, if applicable, SSCS-SDU) from a plurality of SAR-SDUs.

The ATM layer in FIG. 4 is responsible for attaching/stripping the 5 byte header to/from each SAR-PDU to form the 53-octet ATM cell. The physical layer is responsible for placing the cells onto/receiving cells from the transmission link medium. Except in the case of signalling messages directed specifically to it, the nodes of the ATM network shown in FIG. 3, i.e. the remote multiplexer, access, local exchange and tandem exchange nodes, operate only on the ATM cell headers; the 48-byte cell payloads are neither processed nor even read by the ATM network entities.

In addition to the various layers shown in FIG. 4, the protocol layer model for the B-ISDN network of FIG. 3 also includes a management plane responsible for management of all user and control layers within the CP node. The management plane is involved, for example, in the call setup procedures. A layer management entity of the management plane serves to interface each of the user and control layers and is responsible for providing instructions to those layers (either for local management purposes or for transmittal to the management plane of distant CP nodes) and for accepting replies from those layers (either locally generated or generated within the management plane of some distant CP node).

Returning now to FIG. 2, the switching apparatus 21 is provided at a switching node of the ATM network shown in FIG. 3, for example at one of the local exchange nodes (LENS) 114 or at one of the tandem exchange nodes (TENs) 116 thereof. The 4N UNI ports of the apparatus 21 are connected to different respective ATM transmission lines that link the switching node to other switching nodes or to ATM network entities such as the one of the access nodes (AN) 110 or one of the customer premises (CP) nodes 102.

The physical-layer devices $2_1$ to $2_N$ convert the respective bit streams received from the ATM transmission lines connected to the UNI ports into ATM cell streams suitable for delivery to the traffic management devices $24_1$ to $24_N$ which are ATM-layer devices. The functions performed by the physical-layer devices 2 include cell rate decoupling, header error control (HEC) header sequence generation/verification; cell delineation; transmission frame adaptation; transmission frame generation and recovery; and bit timing. The transmission frame adaptation, generation and recovery functions are required because in the physical layer the information may be transmitted in any suitable frame format, for example ITU-T G.707, G.708 and G.709 synchronous digital hierarchy (SDH) format, STM-1 format (155.52 Mbit/s) or ITU-T G.751 plesiochronous digital hierarchy (PDH) E3 format (34.368 Mbit/s). Other suitable formats include fibre distributed data interface (FDDI) 4b/5b as specified by the ATM Forum.

The respective ATM cell streams produced by the physical-layer devices $2_1$ to $2_N$ are transferred via the respective data delivery paths $6_1$ to $6_N$ to the corresponding traffic management devices $24_1$ to $24_N$.

Figure 9:
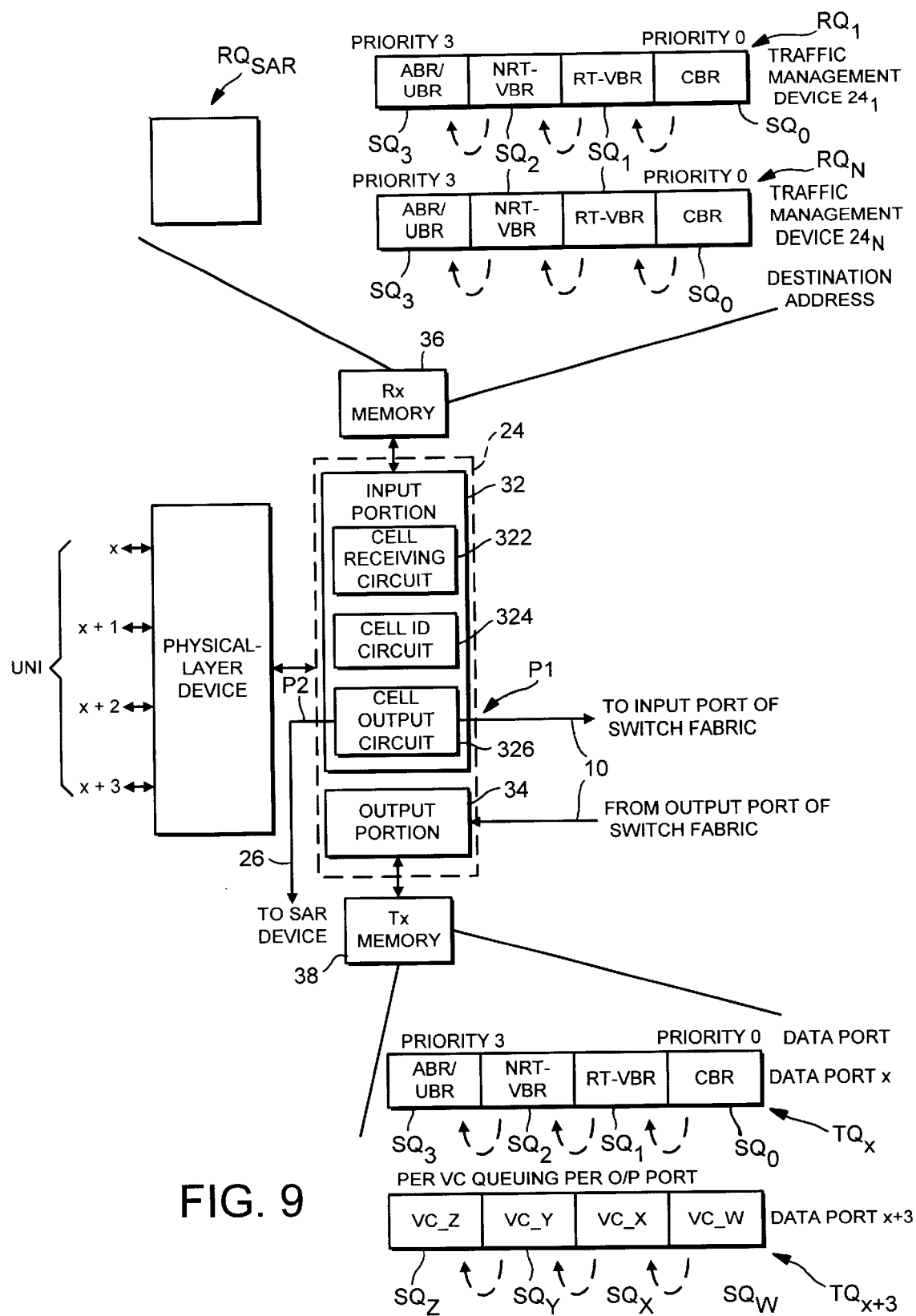
FIG. 9 shows a schematic view of a traffic management device employed in the FIG. 2 switching apparatus, for use in explaining operation of the apparatus.

FIG. 9 is a schematic view of one of the traffic management devices 24. The traffic management device includes an input portion 32 and an output portion 34. The input portion 32 includes a cell receiving circuit 322, a cell identification circuit 324 and a cell output circuit 326. The cell output circuit 326 has a first port P1 connected to the transmit part of the data delivery path 10 linking the input portion 32 to its associated input port of the switch fabric, and a second port P2 connected to the SAR bus 26 linking the input portion 32 to the SAR device 12.

The cells arriving at the input portion 32 from the physical-layer device 2 are received by the cell receiving circuit 322.

Under the control of the cell receiving circuit 322 the cells arriving at the traffic management device are generally buffered temporarily in a receive memory 36 which may form part of the traffic management device itself or, more usually and as shown in FIG. 9, will be a separate memory device such as a static RAM connected by a bus to the traffic management device. The receive memory 36 may be organised, for example, as a plurality of receive queues $RQ_1$ to $RQ_N$ corresponding respectively to the N different traffic management devices of the apparatus. A further receive queue $RQ_{SAR}$ is also provided in the receive memory 36, as will be explained in more detail below.

Each receive queue RQ may also be subdivided into a plurality of sub-queues $SQ_0$ to $SQ_3$ corresponding respectively to different traffic priority levels. In FIG. 9 priority level 3 (the lowest level) corresponds to available bit rate (ABR) and unspecified bit rate (VBR) traffic, priority level 2 corresponds to non-real-time variable bit rate (NRT-VBR) traffic, priority level 1 corresponds to real-time (RT) VBR traffic, and priority level 0 (the highest level) corresponds to constant bit rate (CBR) traffic.

In the cell identification circuit 324, the cell header of each received cell is examined to determine whether the cell forms part of a signalling message or an inter-host communication message that originated in the host processor of another ATM network entity. Such cells may be distinguished from user-data cells based on the VPI/VCI fields of the cell header. For example, the permanent virtual connections reserved for communication of such signalling and inter-host communication messages may all have the special VCI value of 5 (but any suitable VPI value). This enables the cells belonging to signalling and inter-host communication messages to be distinguished from other cells making up normal data messages.

Examples of signalling messages include messages to set up a call (as described previously) and messages to set up point-to-multipoint connections. Point-to-multipoint signalling messages also use the VCI value of 5 because the individual links are set up separately one at a time. Other examples of dedicated signalling messages include Meta-Signalling messages (VPI=arbitrary (VCI=1) and General Broadcast Signalling (VPI=arbitrary, VCI=2). Inter-host communication messages may include user-defined messages which again are identified by assigning the cells making up the message a special VPI/VCI combination. In addition, inter-host communication messages may also include Interim Local Management Interface (ILMI) communications between adjacent ATM UNI Management Entities (UMEs), as described in more detail in "ATM User- Network Interface Specification", Version 3.1, Section 4: Interim Local Management Interface Specification. The cells belonging to such ILMI communication messages will also be allocated one or more specific VPI/VCI values (for example VCI=16 and VPI=any suitable value).

When the cell identification circuit 324 determines that a received cell is a user-data cell the destination traffic management device for the cell concerned is identified using a routing table accessible by the input portion, and the cell is stored in the receive queue RQ (and sub-queue SQ if provided) which corresponds to the destination traffic management device (and cell priority level). The fill levels of the different receive queues can be read periodically by the host processor 16 via the host bus 28 so as to enable the host processor to detect congestion in the switching apparatus.

The traffic management devices operate synchronously in successive time slots. In each time slot, the cell output circuit 326 of each traffic management device is permitted to transfer one (or possibly more) ATM cells to another one of the traffic management devices of the apparatus, the switch fabric 8 providing up to N data transfer paths, each between one of its input ports and one of its output ports. The cell(s) is (are) output from the first port P1 of the cell output circuit 326. The selection of which receive queue the cell(s) to be transferred is (are) taken from is made by the cell output circuit 326 in accordance with scheduling information provided to the traffic management device by the host processor 16. In determining the scheduling, the host processor has regard to possible congestion, but also selects the source-destination pairs for the traffic management devices so as to avoid contention problems in the switch fabric. These matters are discussed in more detail in the present assignee's copending United Kingdom Patent Application No. 9617110.3.

After passage through the switch fabric, cells reaching the output portion 34 of the destination traffic management device are again buffered temporarily in a transmit memory 38. This transmit memory may, like the receive memory 36, be organised as a plurality of transmit queues $TQ_x$ to $TQ_{x+3}$. The transmit queues TQ correspond respectively to the different UNI ports x to x+3 that are controlled by the physical-layer device 2 that is connected to the traffic management device 24 concerned. Each transmit queue may be subdivided into a plurality of sub-queues $SQ_0$ to $SQ_3$ which may correspond to the different priority levels (as in the case of the transmit queue $TQ_x$) or to the different virtual connections $VC_W$ to $VC_Z$ using the UNI port concerned (as in the case of the transmit queue $TQ_{x+3}$).

When, on the other hand, the cell identification circuit 324 in the input portion 32 of the traffic management device 24 determines that a cell received from its corresponding physical-layer device 2 belongs to a signalling message or inter-host communication message, the cell is stored temporarily in the further receive queue $RQ_{SAR}$ corresponding to the SAR device 12.

The SAR device 12, which is the master device for the SAR bus 26 linking it to the different traffic management devices $24_1$ to $24_N$, continually polls the traffic management devices to find out whether any of them has received a cell belonging to a signalling or inter-host communication message. If it is informed by one of the traffic management devices that such a cell has been received, it instructs the cell output circuit 326 of the traffic management device concerned to read the cell from the receive queue $RQ_{SAR}$ and to transmit the cell to it via the second port P2 over the SAR bus 26. The transferred cell is then re-assembled with other cells belonging to the same message by the SAR device 12, the payload portion of the cell being treated as the SAR-SDU and (assuming the message is an AAL5 message) the payload type (PT) information in the PT field of the cell header being decoded to extract the ATM-layer-user-to-ATM-layer-user (AUU) parameter which is needed to detect the beginning, continuation and end SAR-SDUs of the message (cf. FIGS. 6 to 8 above). The memory device 14 connected to the SAR device 12 is used to store the individual SAR-SDUs during reassembly of the message. The different SAR-SDUs belonging to the same message provide segments of the CPCS-PDU. This PDU includes the CPCS-PDU trailer added by the AAL function at the source of the message. The length field in the trailer is used by the SAR device 12 to detect loss or gain of information. Similarly, the CRC field is used by the SAR device to detect bit errors in the CPCS-PDU. From the CPCS-PDU payload, the reassembled message (CPCS-SDU) is then extracted and made available to the host processor 16.

Incidentally, the SAR device 12 may also be used to implement the service specific convergence sub-layer (SSCS), if provided, in which case the CPCS-SDU is converted by the SSCS into the required final message (SSCS-SDU) prior to delivery of that SDU to the host processor.

In the host processor 16 the reassembled message is examined and appropriate action taken in response thereto. For example, when a new call is set up, signalling messages are sent by the call processing function of the ATM network to inform the host processor of the VPI/VCI field allocated to cells belonging to that new connection and to identify the UNI ports of the apparatus which the new connection is to use. This information contained in these signalling messages is registered by the host processor 16 and is also used by the host processor to update the switch routing table (or address translation circuit) of the traffic management device which will receive cells belonging to that new connection as they enter the switching apparatus so that that traffic management device routes the cells to the appropriate destination traffic management device.

If the host processor 16 wishes to send, rather than receive, a signalling message or inter-host communication message, it stores the message in the memory 14 ready for segmentation by the SAR device 12. The SAR device 12 treats the message as a CPCS-SDU (if a SSCS is provided in the SAR device 12, then the original message is treated as a SSCS-SDU and first converted into a CPCS-SDU). A CPCS-PDU is then formed, having the CPCS-SDU as its payload, a padding field, and a CPCS-PDU trailer (FIG. 7). The CPCS-PDU is then segmented into SAR-SDUs, and each SAR-SDU is used to provide the payload of an ATM cell. The PT information in the PT field of the cell header is encoded as shown in FIG. 8 to carry the AUU parameter (AUU=0 for cells constituting the beginning and continuation of the message, and AUU=1 for the cell constituting the end of the message). The VPI/VCI values needed to route the cells to the intended destination are also loaded into the VPI/VCI fields of each cell. For example, a permanent virtual connection may have been reserved for communication between the host processor 16 and the host processor in the destination CP node or other switching node. In this case, the special VPI/VCI values assigned to that permanent virtual connection (e.g. VCI=5, VPI value=arbitrary) are loaded into the VPI/VCI fields of each cell.

The SAR device also identifies the destination traffic management device for the cells belonging to the message, which device is the traffic management device whose corresponding physical-layer device controls the UNI port from which the cells are to be output from the switching apparatus. The SAR device 12 then transfers the cells via the SAR bus 26 to the destination traffic management device, and the cells are stored in the transmit memory 38 in that one of the transmit queues TQ which corresponds to the UNI port from which the cells are to be output. The cells are then transferred from the transmit queue concerned to the UNI port via the physical-layer device 2 under the control of the output portion 34 of the traffic management device.

It will be appreciated that, unlike the FIG. 1 switching apparatus in which the SAR device was connected to a port of the switch fabric, in the FIG. 2 apparatus the ATM cells making up signalling and inter-host communication messages can be transmitted directly from the traffic management devices to the SAR device. All of the ports of the switch fabric are therefore available for switching cells representing user information, which is the predominant information to be switched. Accordingly, the number of UNI ports which the FIG. 2 apparatus is able to support is greater than that possible with the FIG. 1 apparatus. Furthermore, because the cells destined for the SAR device are diverted directly to the SAR device by the traffic management devices, rather than having to pass through the switch fabric, contention in the switch fabric caused by the signalling and other messages is avoided.

It will be appreciated that, although the foregoing embodiment used AAL 5 communication protocols, this is not essential to the invention and any suitable communication protocols requiring segmentation and reassembly functions can be used in embodiments of the present invention.

Furthermore, although in the foregoing embodiment cells which belong to signalling messages and inter-host communication messages were distinguished from other cells on the basis of the VPI/VCI values assigned to the cells, any suitable method of distinguishing the signalling/inter-host communication message cells from user-data cells can be used.

Figure 10:
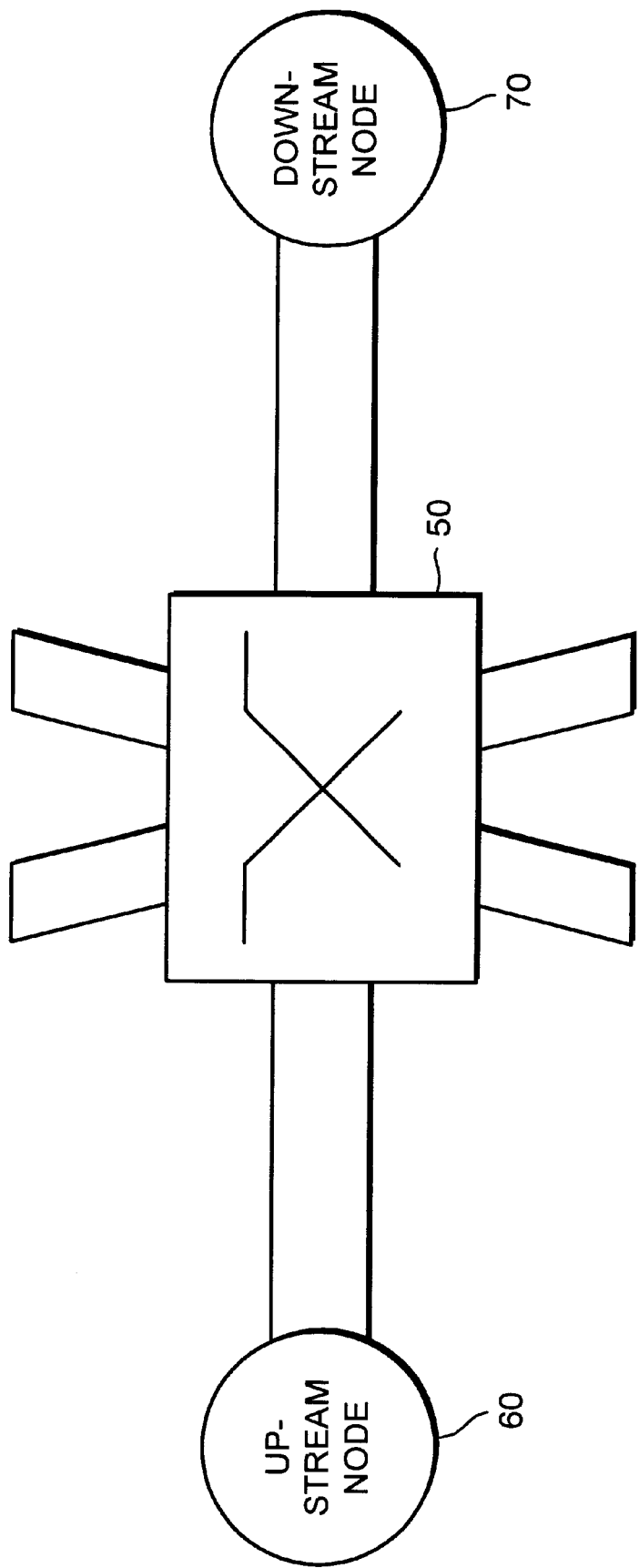
FIG. 10 shows a block diagram showing parts of an ATM network including switching apparatus according to a second embodiment of the present invention.

Another embodiment of the present invention will now be described with reference to FIGS. 10 to 12(D). In this embodiment, as shown in FIG. 10, the switching apparatus is used to implement an Internet Protocol (IP) switch 50 which is arranged between an upstream node 60 of an ATM network and a downstream node 70. The upstream and downstream nodes communicate using Internet Protocols.

Figure 11:
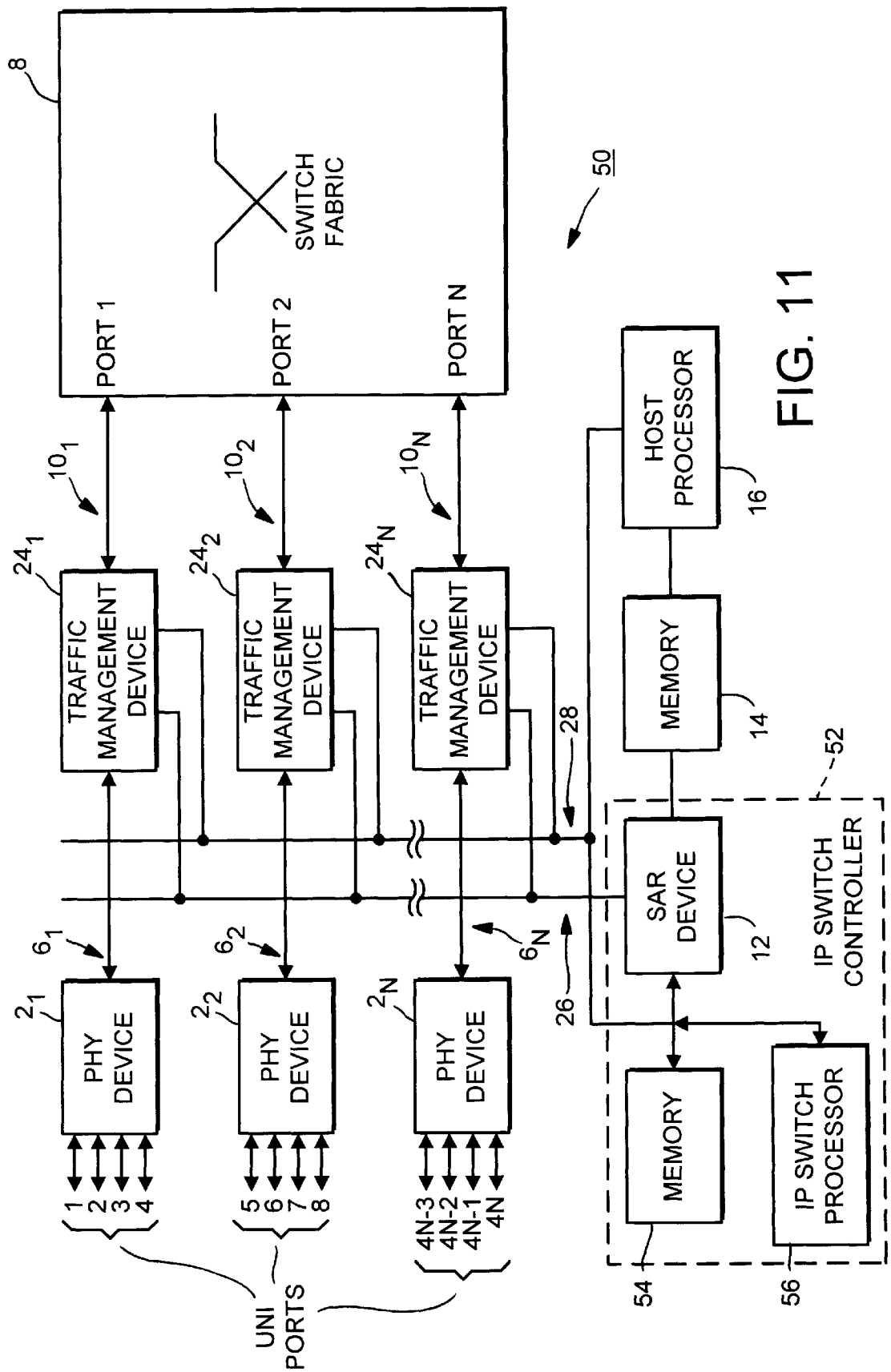
FIG. 11 shows parts of ATM switching apparatus according to the second embodiment of the present invention.

Referring now to FIG. 11, which shows the constitution of the switching apparatus 50 in this embodiment, it can be seen that, in addition to the components previously described with reference to FIG. 2, the switching apparatus 50 further includes an IP switch controller 52 having its own memory 54 and a IP switch processor 56. Both the memory 54 and the IP switch processor 56 are connected to the host bus 28 which links the host processor 16 of the switching apparatus to each of the traffic management devices $24_1$ to $24_N$.

The SAR device 12 is shown in FIG. 11 as part of the IP switch controller 52 but this is not essential and the SAR device 12 could be external to the IP switch controller 52 since it is used both by the host processor 16 and by the IP switch processor 56. The SAR device 12 is connected to the internal memory 54 and the IP switch processor 56 of the IP switch controller 52 by an extension of the host bus 28.

In FIG. 11, the IP switch controller 56 is shown separately from the host processor 16 but, depending upon the size of the switching apparatus, a single processor could be used to provide the host processor 16 and the IP switch processor 56.

In this case, the memories 14 and 54 could also be combined as a single memory.

Operation of the FIG. 11 switching apparatus will now be described with reference to FIGS. 12(A) to 12(D).

Incidentally, in FIGS. 12(A) to 12(D), the respective input and output portions 32 and 34 of each traffic management device 24 (see FIG. 9) are shown separately for the purposes of illustration, even though physically, for example, the input portion $32_1$ and the output portion $34_1$ will both form part of the same traffic management device $24_1$.

Figure 12A:
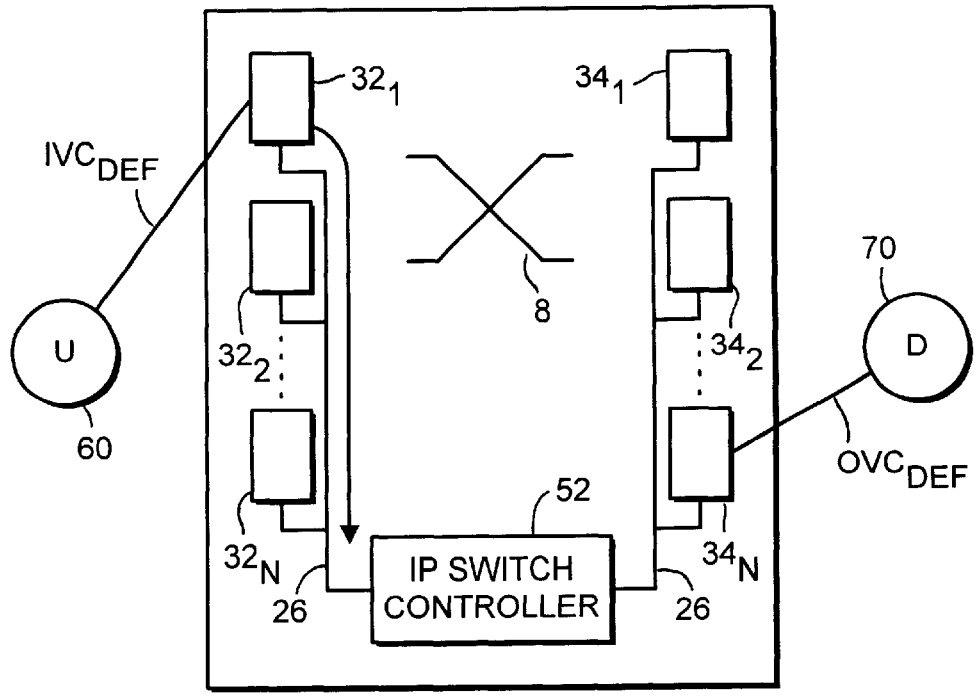
FIGS. 12(A) to 12(D) are schematic diagrams for use in explaining operation of the FIG. 11 apparatus.

In FIG. 12(A), the initial operating condition of the apparatus is shown, in which the upstream node 60 has established a predetermined input virtual channel $IVC_{DEF}$ which is used initially as the default forwarding channel for IP packets between the upstream node 60 and the IP switch 50. As shown in FIG. 12(A), it is assumed in this case that the default forwarding channel $IVC_{DEF}$ has, as its source traffic management device, the traffic management device $24_1$.

A default output virtual channel $OVC_{DEF}$ is also initialised for use in transferring IP packets from the switching apparatus 50 to the downstream node 70. As shown in FIG. 12(A), in this case it is assumed that the default of the virtual channel $OVC_{DEF}$ is controlled by the destination traffic management device $24_N$.

The upstream and downstream nodes 60 and 70 use internet protocols to communicate. IP packets are sent from the upstream node 60 via the switching apparatus 50 to the downstream node 70. These packets may, for example, be up to 64 k bytes in length, and accordingly each packet must be segmented into a plurality of individual ATM cells. Initially, each of the cells has in its header portion a first VPI/VCI combination corresponding to the default input virtual channel $IVC_{DEF}$ when being transferred from the upstream node 60 to the switching apparatus 50, and has a second VPI/VCI combination, different from the first VPI/VCI combination and corresponding to the default output virtual channel $OVC_{DEF}$, when being transferred from the switching apparatus 50 to the downstream node 70. The necessary conversion from the first VPI/VCI combination to the second VPI/VCI combination is carried out in the switching apparatus, for example by the input portion $32_1$ of the source traffic management device $24_1$.

When an IP packet is received, cell-by-cell, by the input portion $32_1$ of the source traffic management device $24_1$ via the default input virtual channel $IVC_{DEF}$, the individual cells making up that packet are distinguished by the input portion $32_1$ from other cells because each cell header has the first VPI/VCI combination corresponding to the default input virtual channel $IVC_{DEF}$.

For reasons that will be explained in more detail later, the input portion $32_1$ passes the cells of the IP packet via the SAR bus 26 to the SAR device 12. In the SAR device 12 the cells belonging to the same IP packet are combined to reassemble the packet using the internal memory 54 of the IP switch controller 52.

The IP switch processor 56 runs intelligent routing software which examines the reassembled packets in the memory 54 for the purpose of identifying so-called IP flows. When examined, network traffic can be classified into short-lived traffic or longer "flow"-oriented transmissions. These flows can be identified either by examining each packet to determine its type, for example file transfer (FTP), or by identifying conversational pairs. Conversational pairs are characterised by a series of packets that contain the same source and destination address. Flows are unidirectional in nature and lend themselves to being transmitted via a switched connection, thus avoiding processing overhead and delays associated with the examination of each individual packet as in the usual routing process.

Figure 12B:
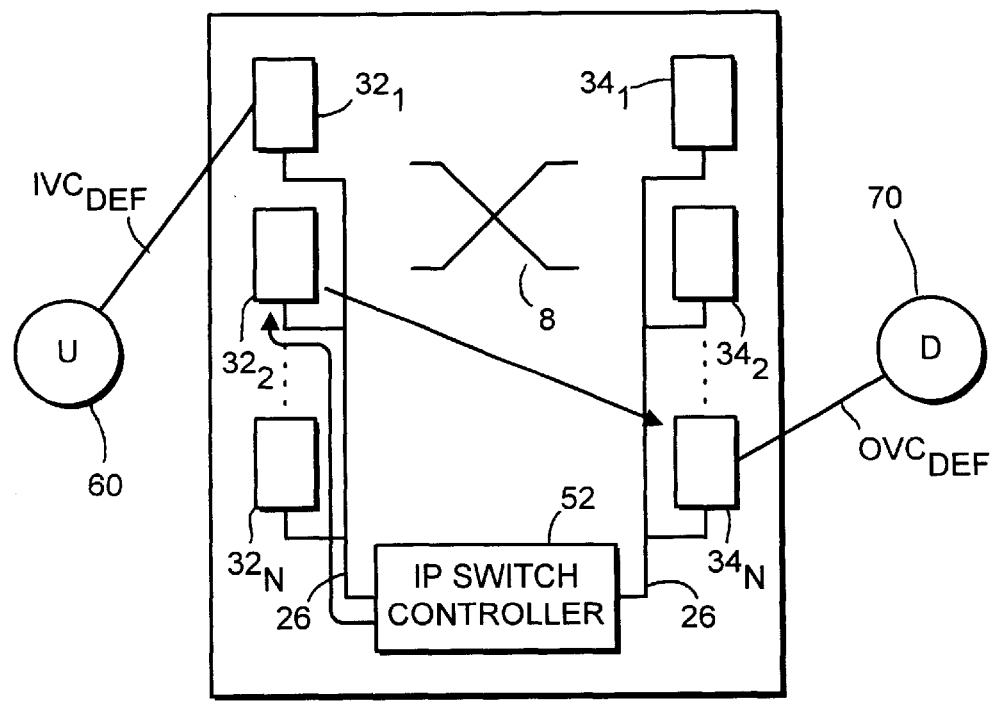
Figure 12C:
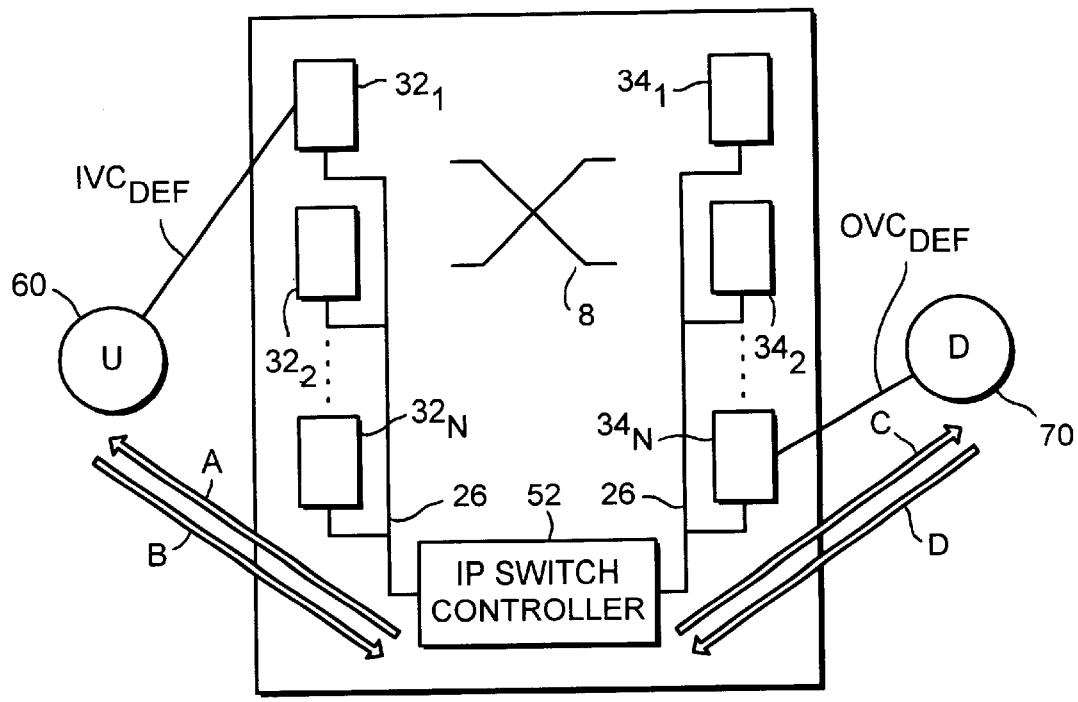

The IP switch controller 52 is provided to enable the switching apparatus to detect flows and to deal with packets that are determined to constitute flows differently from packets not identified as constituting such flows. As shown in FIG. 12(B), if a packet does not form part of a flow, it is simply segmented into individual cells again, and the cells are transferred to the input portion of a selected one of the traffic management devices (for example, in FIG. 12(B), the input portion $32_2$ of the traffic management device $24_2$) for transfer via the switch fabric to the destination traffic management device which in this case is the traffic management device $24_N$. From here the cells are output via the default output virtual channel $OVC_{DEF}$ to the downstream node 70. This corresponds to the conventional (store-and-forward) routing process.

Incidentally, the selection of the traffic management device to which the cells of the segmented packets are sent by the IP switch controller may be determined in dependence the prevailing traffic conditions, for example to avoid congestion/contention in the switching apparatus. Alternatively, the segmented cells could always be sent back to the original source traffic management device ($24_1$ in this example).

However, this conventional process is relatively slow as a whole IP packet must be received, stored and then forwarded by the IP switch controller 52.

If the IP switch controller 52 determines that a flow exists, based for example on the packet type identifier carried by each reassembled packet or upon the numbers of reassembled packets having the same source and destination addresses in a given period, it produces a signalling message A which is transferred to the upstream node 60 via the SAR device 12 (which segments the signalling message into ATM cells) and one of the traffic management devices 24. The signalling message A informs the upstream node 60 that a flow has been detected and requests the upstream node to use a new input virtual channel $IVC_{NEW}$ to send the packets belonging to that flow to the switching apparatus 50, instead of using the default input virtual channel $IVC_{DEF}$. The switching apparatus 50 proposes a VPI/VCI combination for the new virtual channel $IVC_{NEW}$.

If the upstream node agrees to the request and the proposed VPI/VCI combination, it sends a signalling message B back to the IP switch controller 52 via one of the traffic management devices 24 and the SAR device 12 and, from this point onwards, sends each cell belonging to packets of the detected flow with the specified VPI/VCI combination corresponding to the new input virtual channel ($IVC_{NEW}$) in its header.

Simultaneously, the IP switch controller sends a further signalling message C to the downstream node 70 via the SAR device 12 and one of the traffic management devices 24. Like the signalling message A, the signalling message C informs the downstream node that a flow has been detected and requests permission to send the traffic belonging to that flow to the downstream node using a new output virtual channel $OVC_{NEW}$, instead of using the default output virtual channel $OVC_{DEF}$. Again, the IP switch controller 52 proposes a VPI/VCI combination for the new output virtual channel $OVC_{NEW}$. If the downstream node 70 agrees to the request and the proposed VPI/VCI combination, it sends a signalling message D back to the IP switch controller 52.

Figure 12D:
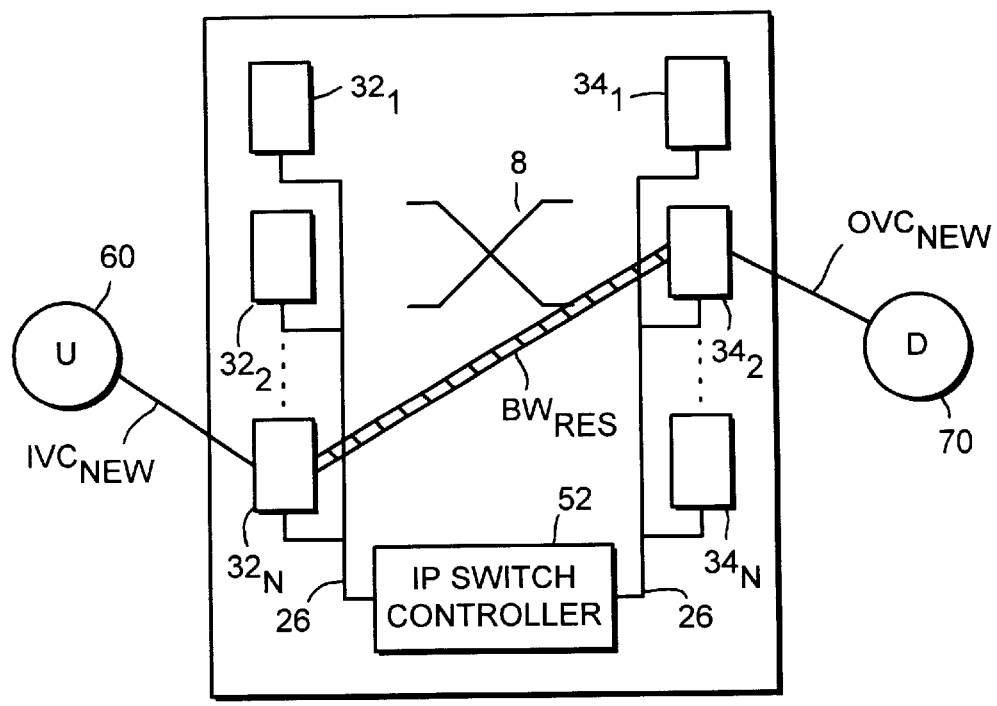

Once the new input and output virtual channels $IVC_{NEW}$ and $OVC_{NEW}$ have been agreed amongst the upstream node 60, the downstream node 70 and the IP switch controller 52, the IP switch controller 52 programs the traffic management devices in the switching apparatus 50 to route the flow directly in hardware. For example, if as shown in FIG. 12(D) the new input virtual channel $IVC_{NEW}$ delivers cells to the input portion $32_N$ of the traffic management device $24_N$ (the new "source" traffic management device), and the new output virtual channel $OVC_{NEW}$ delivers cells from the output portion $34_2$ of the traffic management device $24_2$ (the new "destination" traffic management device) to the downstream node 70, the IP switch controller 52 programs the new source traffic management device $24_N$ with suitable address translation data so that cells received via the new input virtual channel $IVC_{NEW}$ are identified and passed by the source traffic management device $24_N$ via the switch fabric to the destination traffic management device $24_2$, from where they are output to the downstream node 70 via the output virtual channel $OVC_{NEW}$. Accordingly, cells belonging to the detected flow are no longer transferred by the source traffic management device $24_N$ to the SAR device 12 for reassembly and routing, but are transferred cell-by-cell "automatically" through the switching apparatus. The IP switch controller 52 effectively reserves suitable bandwidth BWRES between the source traffic management device $24_N$ and the destination traffic management device $24_2$ for transferring the cells belonging to the flow through the switching apparatus.

The ability for the detected flows to bypass the IP switch controller enables the switching apparatus to forward packets belonging to such flows at rates limited only by the aggregate throughput of the underlying switch engine. Furthermore, because there is no need to reassemble ATM cells into IP packets in the switching apparatus, throughput remains optimised throughout the network.

Although in the above example, the switch to the input virtual channel results in a change of source traffic management device, it will be appreciated that in other instances the source traffic management device could be the same both for the default and new input virtual channels, for example when there is only one physical path linking the upstream node 60 to a single UNI port of the switching apparatus (in this case only the VCI would need to be changed to select the new virtual channel, the VPI staying the same). The same applies to the destination traffic management device used to service the new output virtual channel. It may or may not be the same traffic management device used to service the default output virtual channel, depending on the arrangement of physical paths between the switching apparatus and the downstream node.

In the embodiment described with reference to FIGS. 10 to 12(D) the SAR bus 26 is utilised to send packets that are to be routed on the default store-and-forward basis by the IP switch controller 52 from the source traffic management device to the IP switch controller 52. Accordingly, it is not necessary to connect the IP switch controller to a port of the switch fabric, thereby leaving all ports of the switch fabric free for connection to traffic management devices.

The SAR bus 26 may also be used to convey cells belonging to the signalling messages A to D needed to alert the upstream and downstream nodes to the flows (although the signalling messages could also be delivered to the traffic management devices via the host bus 28, if preferred).

What we claim is:

1. Switching apparatus, for use in an ATM network, comprising:
   a switch fabric for switching ATM cells;
   a reassembly portion for reassembling packets from ATM cells; and
   a traffic management portion connected for receiving ATM cells delivered to the apparatus and also connected by a first data delivery path to said switch fabric and by a second data delivery path, separate from the first data delivery path, to said reassembly portion, and operable to identify as respective reassembly cells those cells amongst the received ATM cells that require reassembly by the reassembly portion, and to deliver received cells other than such identified reassembly cells to the switch fabric via said first data delivery path for switching by said switch fabric and to deliver said reassembly cells to said reassembly portion via said second data delivery path for reassembly into packets by the reassembly portion.

2. Apparatus as claimed in claim 1, wherein the cells identified as reassemble cells comprise cells belonging to packets constituting signaling messages.

3. Apparatus as claimed in claim 1, further comprising a host portion for controlling operation of the apparatus, which host portion is connected operatively to said reassembly portion for receiving therefrom such packets reassembled by the reassembly portion.

4. Apparatus as claimed in claim 3, wherein the cells identified as reassembly cells comprise cells belonging to packets constituting inter-host communication messages directed to said host portion of the apparatus by the host portion of another ATM-network-entity.

5. Apparatus as claimed in claim 1, wherein the cells identified as reassembly cells comprise cells belonging to packets constituting ATM Adaptation Layer (AAL 5) messages.

6. Apparatus as claimed in claim 1, wherein said traffic management portion comprises a cell identification portion operable to examine virtual-path-identifier and/or virtual channel-identifier fields of a header of each received ATM cell and to determine, in dependence upon the results of such examination, whether the received cell is to be identified as such a reassembly cell.

7. Apparatus as claimed in claim 1, further comprising a segmentation portion, connected to said traffic management portion by said second data delivery path, and operable to segment a packet generated locally in the apparatus into a plurality of ATM cells and to deliver the cells of said plurality to the traffic management portion via said second data delivery path.

8. Apparatus as claimed in claim 7, wherein said second data delivery path comprises respective unidirectional transmit and receive paths, the receive paths serving to deliver the identified reassembly cells from the traffic management portion to the reassembly portion, and the transmit path serving to deliver the cells of said plurality from said segmentation portion to the traffic management portion.

9. Apparatus as claimed in claim 7, wherein said segmentation portion and said reassembly portion form part of the same segmentation-and-reassembly device.

10. Apparatus as claimed in claim 1, wherein said traffic management portion comprises a plurality of individual traffic management devices connected respectively to said switch fabric by said first data delivery path for exchanging ATM cells via data transfer paths provided by the switch fabric, and said second data delivery path comprises a bus connecting the individual traffic management devices in common to the reassembly portion.

11. Apparatus as claimed in claim 10, wherein said bus is a Universal-Test-and Operations-PHY-Interface-for-ATM (UTOPIA) level 2 lookalike bus for connecting ATM-layer devices to physical-layer devices.

12. Apparatus as claimed in claim 1, further comprising:
    at least one data port for connection, when the apparatus is in use, to an ATM-network transmission line carrying a bit stream; and
    a physical-layer portion connected between said traffic management portion and said at least one data port for converting the bit stream into one or more corresponding ATM cell streams for delivery to said traffic management portion.

13. Switching apparatus, for use in an ATM network, comprising:
    a switch fabric for switching ATM cells;
    a segmentation portion for segmenting a packet generated locally in the apparatus into a plurality of ATM cells; and
    a traffic management portion connected by a first data delivery path to said switch fabric and by a second data delivery path, separate from said first data delivery path, to said segmentation portion, and operable to receive from the switch fabric via said first data delivery path cells that have been switched by the switch fabric and to receive from the segmentation portion via said second data delivery path the cells of said plurality, and to output an ATM cell stream comprising the switched cells received from the switch fabric and the cells of said plurality received from the segmentation portion.

14. A traffic management device, for use in an ATM switching apparatus having a switch fabric for switching ATM cells delivered to the apparatus and also having a reassembly portion for reassembling packets from ATM cells delivered to the apparatus, the traffic management device comprising:
    a cell receiving portion for receiving ATM cells;
    a cell identification portion connected to said cell receiving portion and operable to identify as respective reassembly cells those cells amongst the received cells that require reassembly by said reassembly portion of the apparatus; and
    a cell output portion having a first port portion adapted for connection, when the device is in use, to said switch fabric, and also having a second port portion, separate from said first port portion, adapted for connection when the device is in use to said reassembly portion, and operable to deliver received cells other than the identified reassembly cells to said first port portion and to deliver said reassembly cells to said second port portion.

15. A device as claimed in claim 14, wherein said cell identification portion is operable to examine the virtual-path-identifier and/or virtual-channel-identifier fields of the header of each received ATM cell and to determine, in dependence upon the results of such examination, whether or not the cell concerned is to be identified as such a reassembly cell.

16. A traffic management device, for use in ATM switching apparatus having a switch fabric for switching ATM cells delivered to the apparatus and also having a segmentation portion for segmenting packets generated locally by the apparatus into a plurality of ATM cells to be output from the apparatus, the traffic management device comprising:

a cell input portion having a first port portion adapted for connection, when the device is in use, to said switch fabric, and also having a second port portion, separate from said first port portion, adapted for connection when the device is in use to said segmentation portion, and operable to receive at said first port portion cells that have been switched by the switch fabric and to receive at said second port portion the cells of said plurality; and a cell output portion for outputting any ATM cell stream comprising the switched cells received from the switch fabric and the cells of said plurality.

17. Apparatus as claimed in claim 1, wherein the cells identified as reassembly cells comprise cells belonging to internet-protocol packets, and the apparatus further comprises an internet-protocol switch controller portion connected with said reassembly portion for examining such reassembled internet-protocol packets to detect packet flows through the switching apparatus.

18. Apparatus as claimed in claim 17, wherein the traffic management portion is operable, in a default routing mode thereof, to receive such internet-protocol packets from an upstream node of the ATM network via a predetermined default input virtual channel and to identify, as such reassembly cells, received ATM cells belonging to said predetermined default input virtual channel and to deliver those cells via said second data delivery path to said reassembly portion so as to permit said internet-protocol switch controller portion to detect packet flows from examination of the reassembled packets, and being switchable, upon detection by said internet-protocol switch controller portion of such a packet flow, to operate in a cut-through switching mode in which the cells of subsequent packets making up the detected packet flow are received by the traffic management portion via a new input virtual channel, different from said predetermined default input virtual channel, and are not identified as such reassembly cells and are delivered directly to the switch fabric via said first data delivery path.

19. Apparatus as claimed in claim 18, wherein reassembled packets not detected by said internet-protocol switch controller portion as belonging to a packet flow are segmented into a plurality of cells which are transferred back to the traffic management portion for delivery to said switch fabric.

20. Apparatus as claimed in claim 19, wherein, after passage through said switch fabric, the cells of said plurality are output to a downstream node of the ATM network via a predetermined default output virtual channel.

21. Apparatus as claimed in claim 18, wherein:
reassembled packets not detected by said internet-protocol switch controller portion as belonging to a packet flow are segmented into a plurality of cells which are transferred back to the traffic management portion for delivery to said switch fabric;
after passage through said switch fabric, the cells of said plurality are output to a downstream node of the ATM network via a predetermined default output virtual channel; and
during operation of the traffic management portion in said cut-through switching mode, the cells of said subsequent packets making up the detected packet flow are output by the traffic management portion via a new output virtual channel, different from said predetermined default output virtual channel.

22. Apparatus as claimed in claim 18, wherein, upon detection by said internet-protocol switch controller portion of such a packet flow, the traffic management portion is caused to reserve bandwidth for switching the cells of the detected packet flow via said switch fabric.

23. Switching apparatus, for use in an ATM network, comprising:
a switch fabric for switching ATM cells;
an internet-protocol switch controller portion for detecting internet-protocol flows through the switching apparatus;
a traffic management portion connected for receiving ATM cells delivered to the apparatus and also connected by a first data delivery path to said switch fabric and by a second data delivery path, separate from the first data delivery path, to said internet-protocol switch controller portion, and operable, in a default routing mode thereof, to identify, as default-routing cells, those received ATM cells that make up packets not detected as belonging to such an internet-protocol flow and to deliver those cells via said second data delivery path to said internet-protocol switch controller portion; and
the traffic management portion also being operable in a cut-through switching mode in which the received ATM cells that make up packets belonging to such an internet-protocol flow are delivered directly to said switch fabric via the first data delivery path.

24. Apparatus as claimed in claim 23, wherein the traffic management portion serves in said default-routing mode to receive the cells making up packets via a default input virtual channel, and is switchable, when the internet-protocol switch controller portion detects that the packets constitute an internet-protocol flow, from the default routing mode to the cut-through switching mode, in which said traffic management portion serves to receive the cells making up subsequent packets of the detected flow via another virtual channel, different from the default input virtual channel.

25. A traffic management device, for use in an ATM switching apparatus having a switch fabric for switching ATM cells delivered to the apparatus and also having internet-protocol switch controller portion for detecting internet-protocol flows through the switching apparatus, which device comprises:
a cell receiving portion for receiving ATM cells;
a cell output portion having a first port portion adapted for connection, when the device is in use, to said switch fabric, and also having a second port potion, separate from said first port portion, adapted for connection when the device is in use to said internet-protocol switch controller portion; and
a cell identification portion connected to said cell receiving portion and operable, in a default routing mode thereof, to identify, as default routing cells, those received ATM cells making up packets that have not been detected as belonging to such an internet-protocol flow and to deliver those cells to said second port portion for transfer to the internet protocol switch controller portion, and also operable in a cut-through switching mode in which those received ATM cells making up packets that have been detected as belonging to such an internet-protocol flow are delivered to the first port portion for transfer directly to the switch fabric.

26. A switching method, for use in ATM network switching apparatus that comprises a switch fabric for switching ATM cells, a reassembly portion for reassembling packets from ATM cells, and a traffic management portion for receiving ATM cells delivered to the apparatus, said method comprising:

identifying cells amongst the received ATM cells that require reassembly by the reassembly portion by the traffic management portion as respective reassembly cells;

delivering received cells other than such identified reassembly cells by the traffic management portion to the switch fabric via a first data delivery path;

switching the delivered cells by the switch fabric; and delivering the identified reassembly cells are from the traffic management portion to the reassembly portion via a second data delivery path separate from the first data delivery path, and reassembling the delivered and reassembled cells into packets by the reassembly portion.

27. A switching method, for use in ATM network switching apparatus that comprises a switch fabric for switching ATM cells, a segmentation portion for segmenting a packet generated locally in the apparatus into a plurality of ATM cells, and traffic management portion for outputting switched cells, said method comprising:

receiving cells that have been switched by the switch fabric by the traffic management portion from the switch fabric via a first data delivery path;

receiving the plurality of cells produced by the segmentation portion by the traffic management portion via a second data delivery path separate from said first data delivery path; and outputting an ATM cell stream, comprising the switched cells received from the switch fabric and the cells of said plurality received from the segmentation portion, by the traffic management portion.

28. Apparatus as claimed in claim 10, wherein:

said reassembly portion is operable as a master device of said bus and each traffic management device is operable as a slave device of said bus; and said reassembly portion comprises:

a polling portion for polling the traffic management devices to determine if any of them has identified a received ATM cell as being such a reassembly cell; and a data reading portion operable, if it is determined by said polling, portion that one of said traffic management devices has identified such a reassembly cell, to cause the traffic management device having that cell to deliver it to the reassembly portion via said bus.

* * * * *